(12) United States Patent
Matsunami

(10) Patent No.: US 11,503,186 B2
(45) Date of Patent: Nov. 15, 2022

(54) IMAGE READING APPARATUS, CONTROL METHOD, AND COMPUTER PROGRAM PRODUCT SUPPRESSING THE INFLUENCE OF NOISE BY COMPARING AND MANAGING COLOR INFORMATION

(71) Applicant: Seiko Epson Corporation, Tokyo (JP)

(72) Inventor: Toshinori Matsunami, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/526,212

(22) Filed: Nov. 15, 2021

(65) Prior Publication Data

US 2022/0159139 A1   May 19, 2022

(30) Foreign Application Priority Data

Nov. 16, 2020 (JP) .............................. JP2020-190120

(51) Int. Cl.

| H04N 1/48 | (2006.01) |
|---|---|
| H04N 1/00 | (2006.01) |
| H04N 1/40 | (2006.01) |
| H04N 1/60 | (2006.01) |
| H04N 1/58 | (2006.01) |

(52) U.S. Cl.
CPC ......... *H04N 1/482* (2013.01); *H04N 1/00798* (2013.01); *H04N 1/40056* (2013.01); *H04N 1/58* (2013.01); *H04N 1/603* (2013.01)

(58) Field of Classification Search
CPC .......... H04N 1/00023; H04N 1/00798; H04N 1/40056; H04N 1/482; H04N 1/58; H04N 1/60–6097
See application file for complete search history.

(56) References Cited

U.S. PATENT DOCUMENTS

2017/0366706 A1\* 12/2017 Takita ................ H04N 1/00933
2019/0007573 A1\* 1/2019 Kikuchi ............. H04N 1/00835

FOREIGN PATENT DOCUMENTS

JP       2018-133646       8/2018

\* cited by examiner

*Primary Examiner* — Scott A Rogers
(74) *Attorney, Agent, or Firm* — Workman Nydegger

(57) ABSTRACT

An image processing portion of an image reading apparatus includes an extraction portion that extracts color information, a management portion that manages management color information that is an estimated value of the color information based on a control signal, a determination portion that determines whether or not the color information matches the management color information, and a writing control portion that causes the storage portion to store the pixel data when it is determined that the color information matches the management color information and that does not cause the storage portion to store the pixel data when it is determined that the color information does not match the management color information. When the color information does not match the management color information, the management portion adjusts the management color information to match the color information.

14 Claims, 10 Drawing Sheets

IMAGE READING APPARATUS, CONTROL METHOD, AND COMPUTER PROGRAM PRODUCT SUPPRESSING THE INFLUENCE OF NOISE BY COMPARING AND MANAGING COLOR INFORMATION

The present application is based on, and claims priority from JP Application Serial Number 2020-190120, filed Nov. 16, 2020, the disclosure of which is hereby incorporated by reference herein in its entirety.

BACKGROUND

1. Technical Field

The present disclosure relates to an image reading apparatus, an image reading control method, and a non-transitory computer-readable storage medium storing a program.

2. Related Art

For example, as in JP-A-2018-133646, there is known a technique in which an image reading apparatus for reading the document corrects pixel data influenced by noise when reading a document. JP-A-2018-133646 discloses a technique in which the image reading apparatus includes linear image sensors for three lines to correct a detection result of a sensor for a line influenced by noise, among the three lines, using detection results of sensors for the other lines.

Since the image reading apparatus of JP-A-2018-133646 corrects the detection result of the linear image sensor for the line influenced by noise, among the three lines, using the detection results of the linear image sensors of the other lines, it is difficult to suppress the influence of noise using the same method in an image reading apparatus including a linear image sensor for only one line.

SUMMARY

According to an aspect of the present disclosure, there is provided an image reading apparatus which acquires an image by reading a document, the apparatus including a plurality of light emission portions that emit light beams of light emission colors different from each other, a light reception portion that receives reflection light of the light beam emitted by each of the light emission portions and reflected by the document and that outputs a light reception signal, a control circuit that outputs a control signal for controlling the light emission portion and the light reception portion, and a relay circuit, based on the control signal, that causes the plurality of light emission portions to sequentially emit light beams at timings different from each other and that causes the light reception portion to receive reflection light of each of the light emission colors and receives a light reception signal from the light reception portion, in which the relay circuit includes a conversion portion that generates digital data by adding color information indicating a color of the reflection light received by the light reception portion to pixel data obtained by performing analog-digital conversion on the light reception signal, the control circuit includes an image processing portion that causes a storage portion to store, for each color indicated by the color information, the pixel data in the digital data received from the conversion portion, the image processing portion includes an extraction portion that extracts the color information from the digital data, a management portion that manages management color information which is an estimated value of the color information based on the control signal, a determination portion that determines whether or not the color information extracted by the extraction portion matches the management color information, and a writing control portion that causes the storage portion to store the pixel data in the digital data when a determination result of the determination portion indicates that the color information matches the management color information and that does not cause the storage portion to store the pixel data when the color information does not match the management color information, and the management portion adjusts the management color information to match the color information when the color information does not match the management color information.

According to another aspect of the present disclosure, there is provided an image reading control method for acquiring an image by reading a document using a plurality of light emission portions that emit light beams of light emission colors different from each other and a light reception portion that receives reflection light of the light beam emitted by each of the light emission portions and reflected by the document, in which a control circuit is included that outputs a control signal for controlling the light emission portion and the light reception portion and in which a relay circuit is included that controls, based on the control signal received from the control circuit, the light emission portion and the light reception portion, the method including the control circuit outputting the control signal to the relay circuit, the relay circuit, based on the control signal, causing the plurality of light emission portions to sequentially emit light beams at timings different from each other, and causing the light reception portion to receive reflection light of each of the light emission colors and receiving a light reception signal from the light reception portion, the relay circuit generating digital data by adding color information indicating a color of the reflection light received by the light reception portion to pixel data obtained by performing analog-digital conversion on the light reception signal and outputting the digital data to the control circuit, the control circuit acquiring management color information which is an estimated value of the color information based on the control signal, the control circuit extracting the color information from the digital data, the control circuit determining whether or not the extracted color information matches the management color information, the control circuit causing the storage portion to store the pixel data when the color information matches the management color information and not causing the storage portion to store the pixel data when the color information does not match the management color information, and the control circuit adjusting the management color information to match the color information when the color information does not match the management color information.

According to still another aspect of the present disclosure, there is provided a non-transitory computer-readable storage medium storing a program, the program being executed by a computer provided in an image reading apparatus which includes a plurality of light emission portions that emit light beams of light emission colors different from each other and a light reception portion that receives reflection light of the light beam emitted by each of the light emission portions and reflected by a document and which acquires an image by reading the document, in which the image reading apparatus includes a computer and a relay circuit that controls, based on a control signal received from the computer, the light emission portion and the light reception portion, the program causing the computer to execute causing the relay circuit to control the light emission portion and the light reception portion by outputting the control signal to the relay circuit, receiving, from the relay circuit, digital data which the relay circuit generates by adding color information indicating a color of the reflection light received by the light reception portion to pixel data obtained by performing analog-digital conversion on a light reception signal from the light reception portion, acquiring management color information which is an estimated value of the color information based on the control signal, extracting the color information from the digital data, determining whether or not the extracted color information matches the management color information, causing the storage portion to store the pixel data in the digital data when the color information matches the management color information and not causing the storage portion to store the pixel data when the color information does not match the management color information, and adjusting the management color information to match the color information when the color information does not match the management color information.

DESCRIPTION OF EXEMPLARY EMBODIMENTS

First Embodiment

Figure 1:
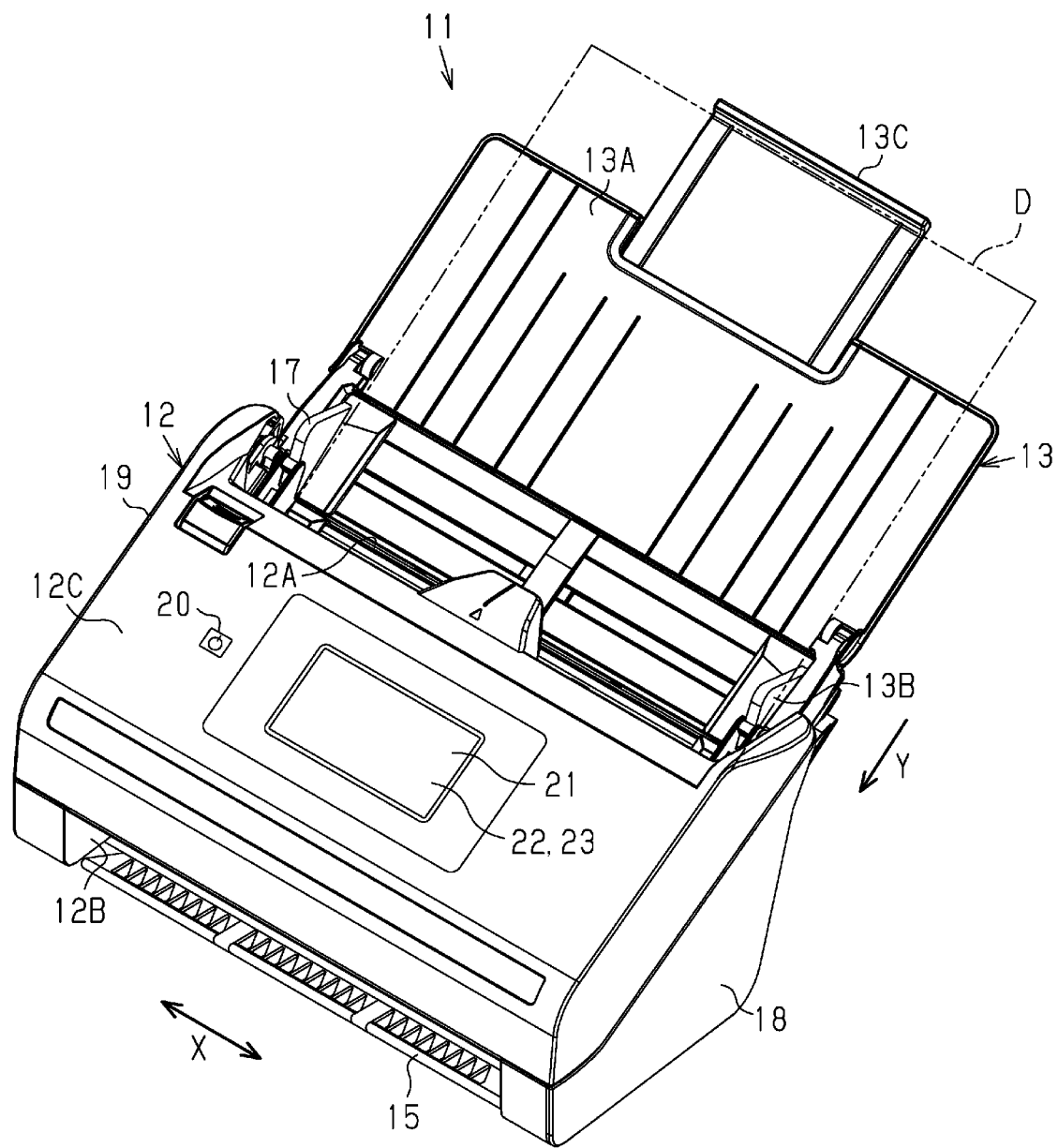
FIG. 1 is a perspective view showing an image reading apparatus according to a first embodiment.

Hereinafter, a first embodiment of an image reading apparatus will be described with reference to the accompanying drawings. As shown in FIG. 1, an image reading apparatus 11 of the present embodiment includes a main body 12 having a substantially trapezoidal shape in side view, and a document support 13 on which a document D, which is an image reading target, is placed (set). A stacker 15 is housed in the main body 12 on a lower side of a discharge outlet 12B in a state of being slidable in front/rear directions.

The document support 13 includes a flat mounting surface 13A on which a plurality of documents D can be placed by extending diagonally upward to a back side of the main body 12. The document support 13 is provided with a pair of edge guides 13B that can slide in a width direction X intersecting (particularly orthogonally) a transport direction Y in which the document D is transported. The document D loaded on the mounting surface 13A is sandwiched between the pair of edge guides 13B to be positioned in the width direction X with respect to a feeding outlet 12A. Further, a slide-type auxiliary support portion 13C is provided to move in and out on the mounting surface 13A of the document support 13. The document D loaded on the mounting surface 13A is positioned in the transport direction Y with respect to the feeding outlet 12A by coming into contact with the slide-type auxiliary support portion 13C. The width direction X is a main scanning direction and the transport direction Y is a sub-scanning direction when the image reading apparatus 11 reads an image of the document D. Hereinafter, there is a case where the width direction X is simply referred to as a "scanning direction X".

The document D placed on the document support 13 is fed one by one from the feeding outlet 12A opened at an upper part of the main body 12 into the main body 12. The fed document D is transported in the main body 12 along a predetermined transport path 29 (see FIG. 2), and, after an image is read in a reading area SA during the transport, is discharged from the discharge outlet 12B that is opened at a lower front part of the main body 12.

A power button 20 is provided on a front surface portion 12C of the main body 12. The front surface portion 12C of the main body 12 is provided with, for example, a display portion 22 such as a display panel for displaying a predetermined image in a display area 23. The display portion 22 is configured to display information related to the image reading apparatus 11. The display portion 22 is provided with an input portion 21 such as a touch panel that can detect a user's touch operation. The input portion 21 is configured to input necessary information according to the user's touch operation when giving an instruction to the image reading apparatus 11.

Figure 2:
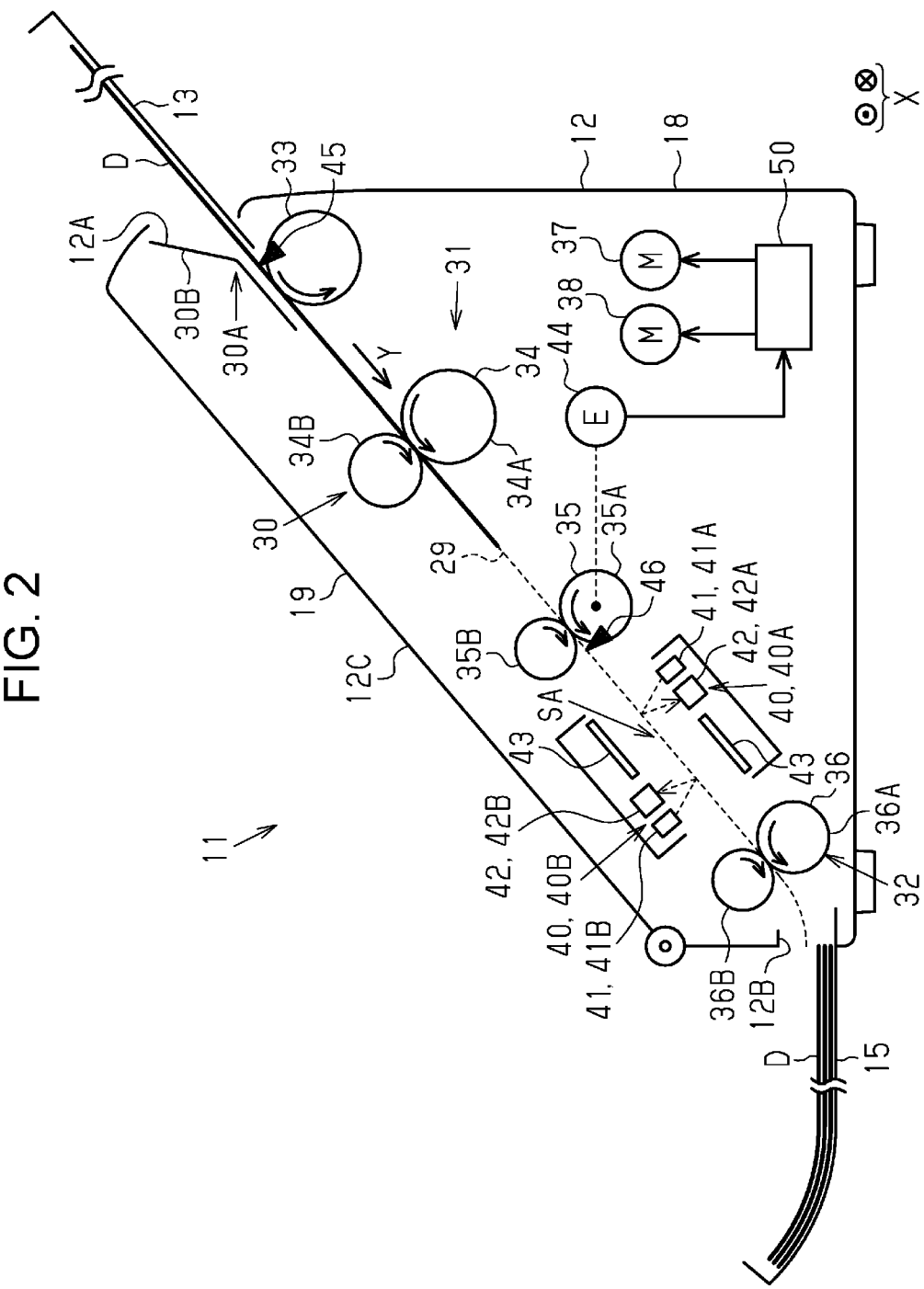
FIG. 2 is a schematic side sectional view showing the image reading apparatus.

As shown in FIG. 2, the main body 12 includes a main body portion 18 and a cover portion 19 rotatably coupled around a front end portion of the main body portion 18. The main body 12 includes a transport path 29 (transport passage) extending from the feeding outlet 12A to the discharge outlet 12B between the main body portion 18 and the cover portion 19.

A transport mechanism 30 that transports the document D is provided in the main body 12. The transport mechanism 30 includes a feeding portion 30A that guides and feeds the document D loaded (set) on the document support 13 one by one into the main body 12, a transport portion 31 that transports the fed document D to pass through the reading area SA along the transport path 29, and a discharge portion 32 that discharges the document D after an image is read during the transport by the transport portion 31. The transport mechanism 30 has an automatic document feeding function that sequentially transports a plurality of documents D loaded on the document support 13 one by one to pass through the reading area SA along the transport path 29.

The feeding portion 30A includes one feeding roller 33 (pickup roller) facing the feeding guide 30B at an upstream end position of the transport path 29 in the main body 12. The feeding portion 30A feeds the plurality of documents D loaded on the document support 13 one by one from the feeding outlet 12A along the feeding guide 30B.

The transport portion 31 includes a feeding roller pair 34 disposed at a position downstream the feeding roller 33 in the transport direction Y, and a transport roller pair 35 disposed at a position upstream the reading area SA in the transport direction Y. The feeding roller pair 34 is composed of a drive roller 34A and a separation roller 34B (retard roller). The transport roller pair 35 is composed of a drive roller 35A and a driven roller 35B.

The discharge portion 32 includes a discharge roller pair 36 disposed at a position downstream the reading area SA in the transport direction Y. The discharge roller pair 36 is composed of a drive roller 36A and a driven roller 36B. The discharge roller pair 36 is also in charge of transport while the document D is being read, together with the transport roller pair 35.

In this way, the feeding roller 33, the feeding roller pair 34, the transport roller pair 35, and the discharge roller pair 36 are respectively disposed in order from upstream the transport direction Y, and are disposed in pairs at intervals in the width direction X, respectively.

The plurality of rollers 33 and 34A of a feeding system are rotationally driven by a power of a feeding motor 37, which is a power source for the plurality of rollers. The plurality of documents D loaded on the document support 13 are sequentially fed one by one from the feeding outlet 12A into the main body 12 from the lowest document by the feeding roller 33. In this way, the feeding portion 30A (rollers 33, 34A, or the like) is driven by using the feeding motor 37 as the power source.

Further, the separation roller 34B of the feeding system and the drive rollers 35A and 36A of the transport system are rotationally driven by the power of a transport motor 38 which is the power source thereof. The document D fed into the main body 12 by the feeding roller 33 is transported to the reading area SA and, thereafter, is discharged from the discharge outlet 12B. In this way, the transport portion 31 (transport roller pair 35, or the like) and the discharge portion 32 (discharge roller pair 36, or the like) are driven by using the transport motor 38 as a common power source.

Further, the drive rollers 35A and 36A are rotationally driven to transport the document D at the same transport speed (reading speed) when the document D is read. Each of the driven rollers 35B and 36B is rotated by the rotation of the drive rollers 35A and 36A which are paired with each other.

Further, an encoder 44 (for example, a rotary encoder) that can detect the rotation of one drive roller of the transport system among the plurality of roller pairs 34 to 36 is provided in the main body 12. The encoder 44 outputs a detection signal, which includes pulses corresponding to a number proportional to the amount of rotation of the drive roller, to the control portion 50 (controller). Therefore, the control portion 50 can grasp a position (transport position) of the document D which is being transported in the control portion 50 and can grasp the transport speed based on the detection signal of the encoder 44.

Further, between a pair of feeding rollers 33, a document sensor 45 for detecting presence/absence of the document D set in the document support 13 is disposed. The document sensor 45 is, for example, a contact sensor having a lever. When the document D is set on the document support 13, the set document D presses the lever, so that the contact sensor is turned on.

Further, a document presence/absence sensor 46 that can detect the presence/absence of the document D is disposed at a position slightly downstream from a nip point of the transport roller pair 35 in the transport direction Y. The document presence/absence sensor 46 is, for example, a contact type sensor having a lever (contactor). The document presence/absence sensor 46 detects the document D and is turned on when a front end of the document D presses the lever, and does not detect the document D and is turned off when a rear end of the document D passes and the lever is not pressed. Therefore, based on a detection signal (ON/OFF) of the document presence/absence sensor 46, the control portion 50 detects that the front end of the document D has passed the transport roller pair 35 and the rear end of the document D has passed the transport roller pair 35. A detection result obtained by the document presence/absence sensor 46 detecting the front end and the rear end of the document D is used to control for determining start and end timings of a reading operation of a reading portion 40 (40A and 40B) which will be described later. Further, since the document presence/absence sensor 46 can detect the front end and the rear end of the document D, the document presence/absence sensor 46 also can detect a length of the document D in the transport direction Y, that is, a document size determined from the length based on a transport distance of the document D from the detection of the front end of the document D to the detection of the rear end. The document presence/absence sensor 46 may be a non-contact sensor such as an optical sensor.

As shown in FIG. 2, the reading portion 40 that reads an image is provided in the main body 12 of the image reading apparatus 11. A pair of reading portions 40 are provided on both sides interposing the transport path 29 at a position between the transport roller pair 35 and the discharge roller pair 36 in the transport direction Y. In the present embodiment, the pair of reading portions 40 include a first reading portion 40A that reads a front surface (lower surface) of the document D transported along the transport path 29, and a second reading portion 40B that reads a back surface (upper surface) of the document D transported along the transport path 29. The pair of reading portions 40 are disposed at positions slightly deviating from each other in the transport direction Y, but may be configured to not include one of the reading portions.

The pair of reading portions 40 are composed of a light source 41 that can irradiate the document D, which is being transported with light, by irradiating the reading area SA with light, and an image sensor 42 that can read an image from the document D. In a normal reading mode, only the first reading portion 40A performs the reading operation to read the front surface of the document D, and, in a double-sided reading mode, both the first reading portion 40A and the second reading portion 40B perform the reading operation to read both sides (front and back surfaces) of the document D.

Figure 7:
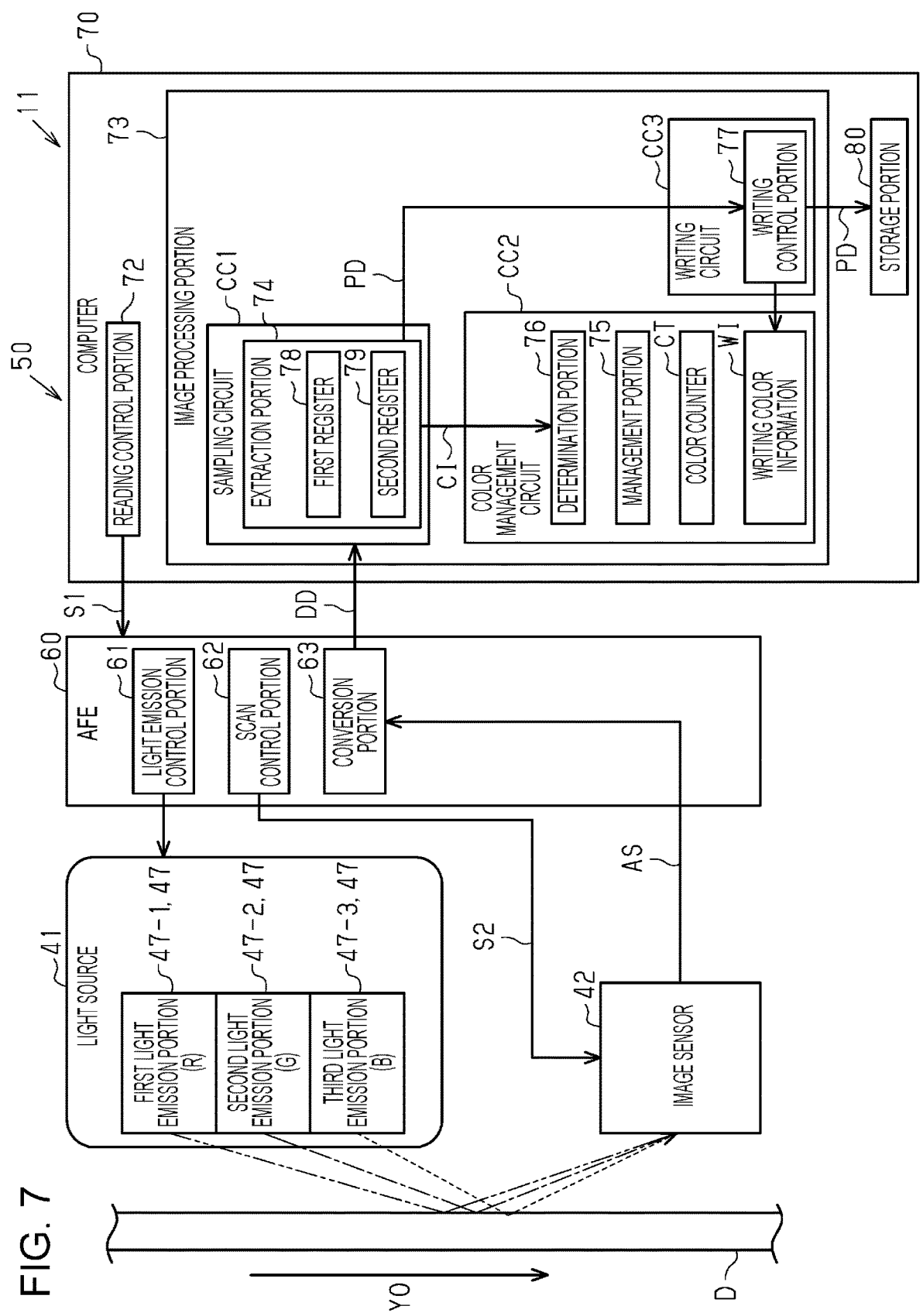
FIG. 7 is a block diagram showing an electrical configuration of a main part of the image reading apparatus which performs a reading process and a writing process.

The light source 41 is composed of, for example, an LED, a fluorescent lamp, or the like. The light source 41 is composed of a plurality of light emission portions 47 that emit light of light emission colors different from each other. Specifically, as shown in FIG. 7, the light source 41 is composed of, for example, a first light emission portion 47-1 that emits red (R) light, a second light emission portion 47-2 that emits green (G) light, and a third light emission portion 47-3 that emits blue (B) light. The light source 41 causes the first light emission portion 47-1 to the third light emission portion 47-3 to emit light for a predetermined time in a predetermined order based on, for example, the control of the AFE 60 which will be described later. In the description below, when the first light emission portion 47-1 to the third light emission portion 47-3 are not distinguished from each other, the light emission portions are simply referred to as the "light emission portion 47".

The image sensor 42 shown in FIG. 2 receives the reflection light of the light emitted by the light source 41 and reflected by the document D, and outputs an analog signal according to the amount of received light by converting the received light into an electric signal. As described above, the image sensor 42 is a sensor that reads an image. The image sensor 42 is, for example, a linear image sensor. The image reading apparatus 11 can perform color scanning and monochrome scanning (grayscale scanning). When the first light emission portion 47-1 shown in FIG. 7 is emitting light, the image sensor 42 receives the reflection light of the light emitted by the first light emission portion 47-1 and reflected by the document D. Further, when the second light emission portion 47-2 shown in FIG. 7 is emitting light, the image sensor 42 receives the reflection light of the light emitted by the second light emission portion 47-2 and reflected by the document D. Further, when the third light emission portion 47-3 shown in FIG. 7 is emitting light, the image sensor 42 receives the reflection light of the light emitted by the third light emission portion 47-3 and reflected by the document D. The image sensor 42 is an example of a "light reception portion", and the analog signal is an example of a "light reception signal".

Hereinafter, there is a case where the light source 41 and the image sensor 42 shown in FIG. 2 are referred to as a first light source 41A and a first image sensor 42A by pointing those on a side of the first reading portion 40A, and are referred to as a second light source 41B and a second image sensor 42B by pointing those on a side of the second reading portion 40B. Further, the plurality of light emission portions 47 included in the first light source 41A are described as a first light emission portion 47A-1, a second light emission portion 47A-2, and a third light emission portion 47A-3, and a plurality of light emission portions 47 included in the second light source 41B are referred to as a first light emission portion 47B-1, a second light emission portion 47B-2, and a third light emission portion 47B-3.

The image sensor 42 is, for example, a contact type image sensor in which a plurality of photoelectric conversion elements are disposed in a row along the main scanning direction X. Specifically, the image sensor 42 is a Complementary Metal Oxide Semiconductor (CMOS) image sensor. In this case, the image sensor 42 outputs an analog signal for one line indicating intensity of the received light to a conversion portion 63.

Further, a color reference plate 43 is disposed to face the image sensor 42 while interposing the transport path 29 therebetween. The color reference plate 43 is disposed in an area that includes an area of the document D and is wider than the area of the document D in the area which is the image reading target of the reading portion 40. Therefore, the color reference plate 43 is a member that can grasp whether or not the area of the document D as the image read by the reading portion 40. That is, the color reference plate 43 is a background plate that can be read as a background of the document D. Further, the color reference plate 43 is a member for obtaining a white reference value for shading correction, and a white reference plate exhibiting white or a gray reference plate exhibiting gray is used. As a result, the color reference plate 43 is read as a white reference image, and the white reference value is generated based on the read white reference image. The gray reference plate is read as the background of the document (gray background) and is used to detect the position and area of the document D. When a sensor for detecting the document area is separately provided, the color reference plate 43 is preferably the white reference plate. Further, the color reference plate 43 is not limited to the plate shape, and any shape and color may be used as long as a reference member for obtaining the white reference value that is a reference for brightness.

The image reading apparatus 11 includes a control portion 50. The control portion 50 performs a reading process by controlling each portions when a job reading the image from the document D is input based on an operation signal from the input portion 21 (see FIG. 1) operated by the user or a reading instruction signal (reading instruction) from an external terminal device (host device) communicably coupled to the image reading apparatus 11. The control portion 50 controls, for example, the feeding motor 37, the transport motor 38, and the reading portion 40 (40A, 40B), and processes image data based on the image read from the document D by the reading portion 40.

Figure 3:
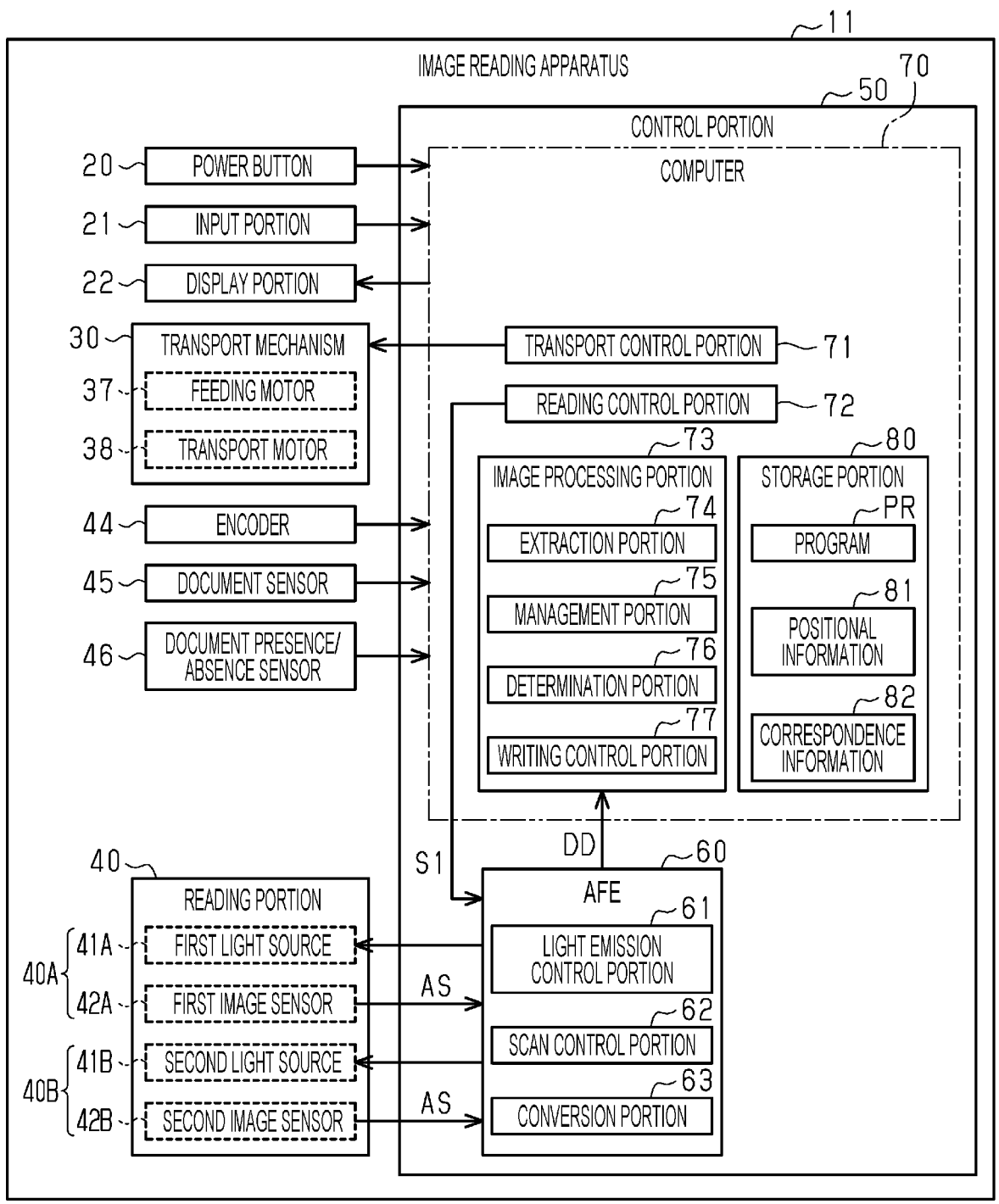
FIG. 3 is a block diagram showing an electrical configuration of the image reading apparatus.

Next, an electrical configuration of the image reading apparatus 11 will be described with reference to FIG. 3. As shown in FIG. 3, the image reading apparatus 11 is installed inside the control portion 50 that collectively controls the image reading apparatus 11. The control portion 50 includes a computer 70 consisting of a microprocessor and the like. In the present embodiment, the computer 70 corresponds to an example of a "control circuit". The computer 70 includes, for example, a transport control portion 71, a reading control portion 72, an image processing portion 73, and a storage portion 80.

The control portion 50 includes an analog front end 60 (hereinafter, also referred to as "AFE 60") as an example of a relay circuit. The AFE 60 includes, for example, a light emission control portion 61, a scan control portion 62, and the conversion portion 63.

The transport control portion 71, the reading control portion 72, and the image processing portion 73 are realized by executing a program PR (software) by a hardware processor such as a Central Processing Unit (CPU). Some or all of the components may be realized by hardware (including a circuit portion: circuitry) such as Large Scale Integration (LSI), Application Specific Integrated Circuit (ASIC), Field-Programmable Gate Array (FPGA), or Graphics Processing Unit (GPU), or may be realized by cooperation of software and hardware.

The program PR may be stored in advance in the storage portion 80 realized by an HDD, a flash memory, or the like, or may be stored in a removable storage medium (non-transient storage medium), such as a DVD or a CD-ROM, to be installed in such a way that the storage medium is mounted on a drive device. Further, the storage portion 80 stores positional information 81 and correspondence information 82. Details of the positional information 81 and the correspondence information 82 will be described later.

The transport control portion 71 drives and controls the feeding motor 37 and the transport motor 38. When the feeding roller 33 is rotated by driving the feeding motor 37, the plurality of documents D set in the document support 13 are sequentially fed into the main body 12 one by one in order from the lowest one. Further, when the feeding motor 37 is driven, one drive roller 34A included in the feeding roller pair 34 is rotationally driven, and, when the transport motor 38 is driven, the other separation roller 34B is rotationally driven. In particular, the transport control portion 71 drives and controls the feeding motor 37 and the transport motor 38 so that the document D is transported at a reading speed according to the reading resolution (for example, 300/600 dpi) in the reading area SA in the middle of the transport path 29. For example, when the reading resolution is relatively low (for example, 300 dpi), the document D is transported at a high speed, and, when the reading resolution is relatively high (for example, 600 dpi), the document D is transported at a low speed.

The reading control portion 72 controls the reading portion 40 via the AFE 60, and causes the reading portion 40 to read the image of the document D. In particular, the reading control portion 72 outputs a control signal S1, which prescribes an operation timing of various operations including a scan operation, to the AFE 60. The control signal S1 is, for example, a pulse signal that outputs a pulse at each predetermined time. The predetermined time corresponds to a time interval when reading a reading result for each line from the image sensor 42.

Whenever a pulse of the control signal S1 is input, the light emission control portion 61 outputs an instruction signal (hereinafter, a light emission drive signal) that indicates one light emission portion to be emitted among the three light emission portions 47-1 to 47-3. Specifically, the light emission control portion 61 outputs the light emission drive signal to sequentially switch one light emission portion to emit light whenever the pulse of the control signal S1 is input. Therefore, among the three light emission portions 47-1 to 47-3, only one light emission portion instructed by the light emission drive signal emits light. Then, the three light emission portions 47-1 to 47-3 sequentially emit light at the same cycle as the pulse cycle of the control signal S1. The order of light emission colors is determined in advance. Hereinafter, it is assumed that the light emission color to be emitted first is red and an emission order is set in the order of red, green, and blue.

The scan control portion 62 controls a scan timing of the analog signal, which is a light reception signal for one line received by the image sensor 42 during one light emission period of the light emission portion 47, based on the control signal S1 input from the reading control portion 72. The image sensor 42 outputs the analog signal for one line to the conversion portion 63 at each scan timing instructed by the scan control portion 62. The scan control portion 62 outputs a scan signal S2 (see FIG. 7) to the image sensors 42A and 42B, for example, at a timing when the pulse of the control signal S1 is input from the reading control portion 72. The scan signal S2 is a pulse signal having the same cycle as the control signal S1. The scan control portion 62 generates the scan signal S2 having the same cycle based on the input control signal S1. Whenever the pulse of the scan signal S2 is input from the reading control portion 72, the image sensors 42A and 42B output the analog signal for each line to the AFE 60.

The conversion portion 63 performs analog-digital conversion on the analog signal output from the image sensor 42 to generate pixel data PD. Further, the conversion portion 63 generates digital data DD by adding color information CI indicating a color of the reflection light received by the image sensor 42 to the pixel data PD. The conversion portion 63 converts the analog signal into the digital data DD, for example, whenever the light emission drive signal is input from the light emission control portion 61.

In the above description, the case where the image sensors 42A and 42B output the analog signal to the AFE 60 when the scan signal S2 is input from the scan control portion 62 has been described, but the present disclosure is not limited thereto. Hereinafter, a case will be described where the image sensors 42A and 42B output the analog signal to the AFE 60 when the scan signal S2 is input from the reading control portion 72.

Figure 4:
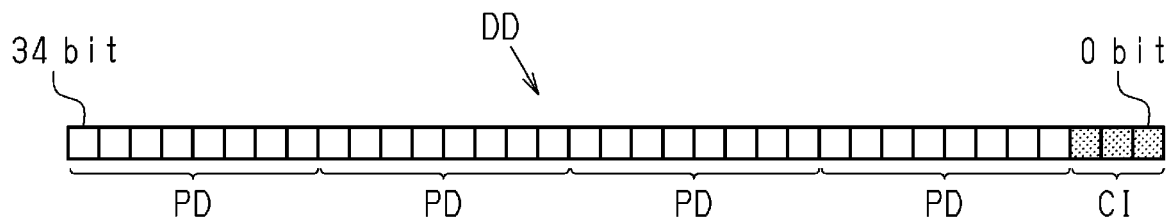
FIG. 4 is a diagram showing an example of a configuration of first digital data.

In the digital data DD, for example, one frame includes bits of a plurality of digits. Hereinafter, a case will be described where the digital data DD is data of 35 bits per frame. FIG. 4 shows first digital data DD showing an example of a configuration of the digital data DD, FIG. 5 shows second digital data DD showing another example of the configuration of the digital data DD, and FIG. 6 shows a third digital data DD showing still another example of the configuration of the digital data DD.

Figure 5:
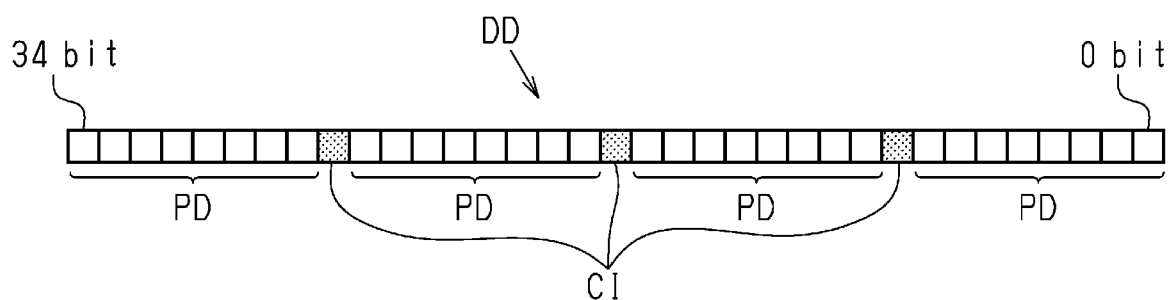
FIG. 5 is a diagram showing an example of a configuration of second digital data.
Figure 6:
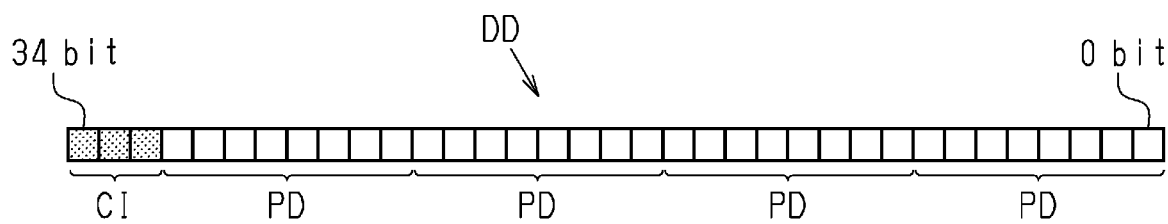
FIG. 6 is a diagram showing an example of a configuration of third digital data.

As shown in FIGS. 4 to 6, the 35-bit digital data DD includes, for example, color information CI represented by 3 bits. Generally, the intensity of the received light is represented by 8-bit data having 256 gradations through analog-digital conversion. Therefore, the digital data DD includes a total of 35-bit data including the 3-bit color information CI and the 8-bit data for up to 4 pixels. The digital data DD includes pixel data PD for 1 to 4 pixels, for example, according to resolution of an image generated through a reading process. All the pixel data PD included in the same frame is light emission color data indicated by the color information CI. The conversion portion 63 generates a plurality of digital data DD including, for example, the pixel data PD of pixels having the number of pixels corresponding to the resolution of the generated image and the number of pixels corresponding to one line based on the analog signal acquired from the image sensor 42.

Here, the image reading apparatus 11 is equipped with any AFE 60 among a plurality of types of AFE 60. According to the type of AFE 60, there is a case where a bit position of 3 bits indicating the color information CI included in the 35-bit digital data DD differs. In other words, the color information CI includes a plurality of bits having values located in some digits in the digital data DD including bits of a plurality of digits. The digital data DD obtained through conversion performed by the conversion portion 63 of a certain type of AFE 60 indicates the color information CI by, for example, the first 3 bits (see FIG. 4). Further, the digital data DD obtained through conversion performed by the conversion portion 63 of another type of AFE 60 indicates the color information CI by a total of 3 bits, which is one bit between the 8-bit pixel data PD for 4 pixels (see FIG. 5). Further, the digital data DD obtained through conversion performed by the conversion portion 63 of another type of AFE 60 indicates the color information CI by the last 3 bits (see FIG. 6).

The positional information 81 stored in the storage portion 80 is, for example, information indicating a bit position composing the color information CI among the plurality of digit bits composing the digital data DD. The storage portion 80 stores, for example, the positional information 81 corresponding to the AFE 60 equipped in the image reading apparatus 11 and, that is, the positional information 81 indicating the bit position of the color information CI included in the digital data DD in advance.

The bit position of the color information CI in the above-described digital data DD is an example, the bit position is not limited thereto, and the color information CI may be at another bit position.

The image processing portion 73 stores, for example, the pixel data PD in the digital data DD input from the conversion portion 63 in the storage portion 80 for each color indicated by the color information CI. The image processing portion 73 acquires the digital data DD from the AFE 60 at each predetermined time. That is, the image processing portion 73 inputs the digital data DD sent from the AFE 60 for each reading cycle based on the scan signal S2 output to the AFE 60 by the scan control portion 62. The image processing portion 73 includes, for example, an extraction portion 74, a management portion 75, a determination portion 76, and a writing control portion 77.

The extraction portion 74 extracts the color information CI from the digital data DD. The extraction portion 74 extracts a plurality of bits (for example, 3 bits) of color information CI by acquiring a value of the bit position indicated by the positional information 81 from, for example, the digital data DD acquired from the AFE 60. The extraction portion 74 separates the digital data DD into the color information CI and the pixel data PD by extracting the color information CI. The extraction portion 74 sends the color information CI to the determination portion 76, and sends the pixel data PD to the writing control portion 77.

The management portion 75 manages management color information MC, which is an estimated value of the color information CI, based on the control signal S1. That is, the management portion 75 estimates the color information CI included in the digital data DD input from the AFE 60 based on the control signal S1 output by the reading control portion 72, and manages the estimated value as the management color information MC. The management color information MC is information indicating a schedule of the color information CI included in the digital data DD acquired from the AFE 60.

The determination portion 76 determines whether or not the color information CI extracted by the extraction portion 74 matches the management color information MC managed by the management portion 75. A determination result of the determination portion 76 is sent to the management portion 75. When the management portion 75 obtains the determination result indicating that the color information CI matches the management color information MC from the determination portion 76, the management portion 75 permits the writing control portion 77 to store (write) the pixel data PD in the storage portion 80. On the other hand, when the management portion 75 obtains the determination result indicating that the color information CI does not match the management color information MC from the determination portion 76, the management portion 75 prohibits the writing control portion 77 from storing (writing) the pixel data PD in the storage portion 80.

When writing is permitted by the management portion 75 when the color information CI matches the management color information MC, the writing control portion 77 stores the pixel data PD sent from the extraction portion 74 in the storage portion 80. Further, when writing is prohibited by the management portion 75 when the color information CI does not match the management color information MC, the writing control portion 77 does not store the pixel data PD sent from the extraction portion 74 in the storage portion 80.

Detailed Configuration Related to Reading Process and Writing Process

Hereinafter, with reference to FIG. 7, details of a configuration in which the image reading apparatus 11 performs the reading process and the writing process will be described.

As shown in FIG. 7, the computer 70, which is an example of the control circuit, includes the reading control portion 72, the image processing portion 73, and the storage portion 80. The image processing portion 73 includes, for example, a sampling circuit CC1, a color management circuit CC2, and a writing circuit CC3. The sampling circuit CC1 includes the extraction portion 74. The color management circuit CC2 includes the management portion 75, the determination portion 76, and a color counter CT. The writing circuit CC3 includes the writing control portion 77. The extraction portion 74 includes a first register 78 and a second register 79. The first register 78 is an example of a "first storage portion", and the second register 79 is an example of a "second storage portion". All or some of the respective circuits CC1 to CC3, or the functional configuration parts, such as the extraction portion 74, the management portion 75, the determination portion 76, the writing control portion 77, and the reading control portion 72 inside each of the circuits CC1 to CC3, may be composed of the computer 70 that executes the program PR.

First, the reading control portion 72 outputs the control signal S1 to the AFE 60 when starting the reading process. That is, the computer 70 outputs the control signal S1 to the AFE 60 by the reading control portion 72. The light emission control portion 61 outputs the light emission drive signal to the light source 41 based on the control signal S1 input from the reading control portion 72. When a first pulse of the control signal S1 is input from the reading control portion 72 with the start of the reading process, the light emission control portion 61 outputs the light emission drive signal for instructing the first light emission portion 47-1 to emit light first among the plurality of light emission portions 47. Thereafter, the light emission control portion 61 outputs the light emission drive signal instructing the light source 41 to switch the light emission color whenever the pulse of the control signal S1 is input.

As shown in FIG. 7, the reading control portion 72 also outputs the control signal S1 to a color counter CT in the same computer 70. The computer 70 includes the color counter CT that repeatedly counts the number of pulses of the control signal S1 to the same value as the number of light emission colors that can be emitted by the light source 41. The management portion 75 manages the management color information MC based on a count value of the color counter CT. As described above, the light source 41 of the present embodiment can emit three light emission colors of red, green, and blue. The management portion 75 of the present embodiment repeatedly counts the number of pulses of the control signal S1 input from the reading control portion 72 by 3 counts from 0 to 2 by the color counter CT. The color counter CT changes the count value by 1 each time the pulse of the control signal S1 is input from the reading control portion 72. The management portion 75 performs counting of the color counter CT when the color information CI matches the management color information MC, and stops counting of the color counter CT and maintains the value of the management color information MC when the color information CI does not match the management color information MC.

As described above, the order of light emission colors is red, green, and blue. When the management portion 75 changes the color counter CT in ascending order, the light emission color corresponding to 0 is "red", the light emission color corresponding to 1 is "green", and the light emission color corresponding to 2 is "blue".

Here, a timing at which the AFE 60 causes the plurality of light emission portions 47-1 to 47-3 to sequentially emit light of light emission colors different from each other based on the light emission drive signal, and a scan timing at which the AFE 60 scans the analog signal obtained in such a way that the image sensor 42 receives the reflection light of the light emission color deviate by one pulse cycle of the control signal S1. Therefore, the color counter CT starts counting from a second pulse delayed by one pulse cycle from the first pulse of the control signal S1. An initial value of the color counter CT is, for example, "0". Since the management color information MC is information indicating colors corresponding to the three count values of "0", "1", and "2" which are the count values of the color counter CT, the color indicated by the management color information MC changes according to the control signal S1. The light emission colors that the light source 41 emits at timings different from each other are not limited to the three colors, and may be, for example, four colors. In this case, the color counter CT may repeat 4 counts of 0 to 3, and manage the colors corresponding to the count values as 4 colors of the management color information MC which is the estimated value of the color information CI.

Action

Figure 8:
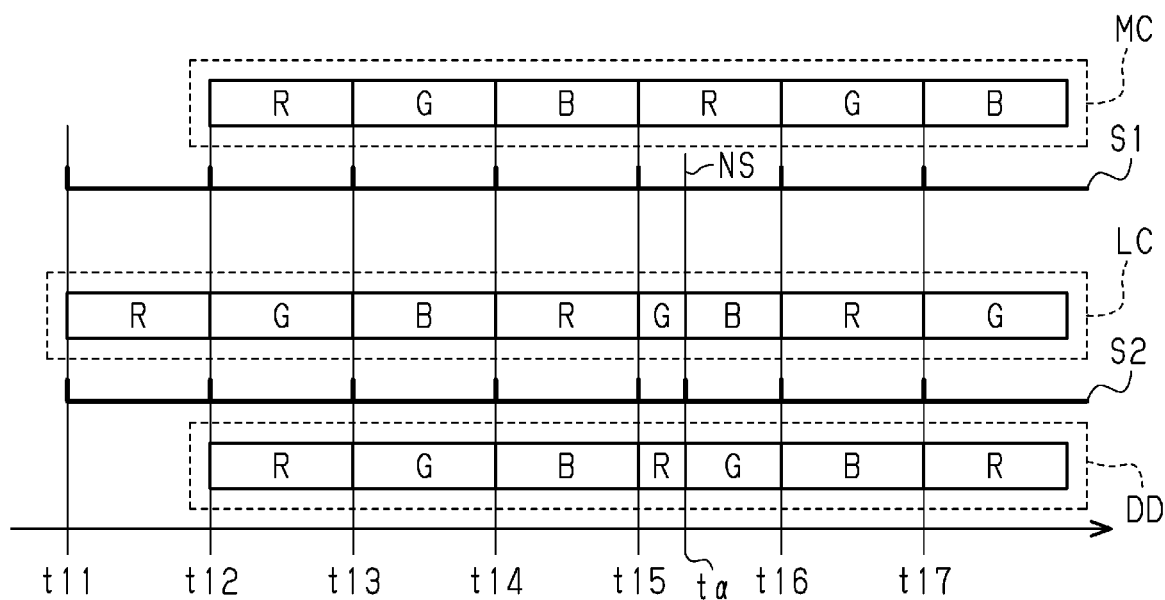
FIG. 8 is a diagram showing a chronological change in a control state of the image reading apparatus.

Hereinafter, an action of the image reading apparatus 11 will be described with reference to FIG. 8 and the like. In FIG. 8, a horizontal axis indicates time, and in order from the top, the management color information MC, the control signal S1, the light source light emission color LC, the scan signal S2, and the digital data DD are shown. In an example of FIG. 8, at time t11, the reading control portion 72 outputs the pulse of the control signal S1. When the pulse of the control signal S1 is first input at time t11, the light emission control portion 61 first outputs a light emission drive signal instructing the first light emission portion 47-1 to emit light, and causes the first light emission portion 47-1 to emit red light. Then, from time t11, the first light emission portion 47-1 is continuously caused to emit red (R) light during a predetermined light emission period. Hereinafter, the light emission color of the light emission portion that is actually emitting light based on the control of the light emission control portion 61 will be referred to as "light source light emission color LC". In this case, the light source light emission color LC is red from time t11 to time t12.

When the light emission control portion 61 inputs a next pulse of the control signal S1 from the reading control portion 72 at time t12, the light emission control portion 61 outputs the light emission drive signal to the second light emission portion 47-2 scheduled to emit light next, and causes the second light emission portion 47-2 to emit green (G) light from time t12 to t13. In this case, the light source light emission color LC is green from time t12 to time t13.

As shown in FIG. 8, the scan control portion 62 causes the image sensor 42 to start the reading operation for one line at a timing of time t11 when the pulse of the control signal S1 is input. As the reading operation for one line, the image sensor 42 receives the reflection light from the document D, which reflects the red light from the first light emission portion 47-1 that emits light at that time, for a predetermined light reception period. When a predetermined light reception period elapses, the scan control portion 62 outputs the scan signal S2 to the image sensor 42. The image sensor 42 outputs the analog signal (light reception signal) for one line to the AFE 60 when the scan signal S2 is input from the scan control portion 62.

The conversion portion 63 converts the analog signal input from the image sensor 42 into the pixel data PD (FIGS. 4 to 6) by performing the analog-digital conversion at the timing of time t12. The conversion portion 63 acquires information on the light emission color related to which light emission portion caused to emit light by the light emission control portion 61 by the light emission drive signal. The conversion portion 63 specifies a color immediately before a current light emission color information from the light emission control portion 61 in the emission order as the color of the pixel data PD.

As described above, in the present embodiment, as an example, the light emission control portion 61 causes the light emission portions to emit light one by one in the order of red, green, and blue. Therefore, at time t12, the conversion portion 63 specifies red, which is the light emission color immediately before the current light emission color, green, as the color of the pixel data PD. The conversion portion 63 generates the digital data DD by adding the color information CI indicating red to the pixel data PD at time t12.

The conversion portion 63 may include a pulse counter that repeatedly counts the number of pulses of the control signal S1 by 3 counts from 0 to 2, and may specify the color of the reflection light received by the image sensor 42 based on the count value. In this case, the conversion portion 63 may specify the light emission color emitted by the image sensor 42 based on the count value of the pulse counter and the predetermined emission order.

The image processing portion 73 acquires the digital data DD, in which the color information CI indicates red, at time t12. Further, at time t12, the management color information MC indicates red. Therefore, the color of the color information CI included in the digital data DD and the color indicated by the management color information MC show red and match each other between time t12 and time t13.

Through the above-described process, whenever the reading control portion 72 outputs the pulse of the control signal S1, the light emission control portion 61 outputs the pulse of the light emission drive signal and changes the light emission portion 47 scheduled to emit light in order. Along with this, the color of the color information CI included in the digital data DD and the color indicated by the management color information MC change in order while matching each other.

Here, there is a case where noise is superimposed on a wiring that couples the AFE 60 to the computer 70. In an example shown in FIG. 8, noise NS is superimposed on the control signal S1 at time ta. At time ta, the light emission control portion 61 regards the noise NS as the pulse of the control signal S1 and switches the light emission portion 47 scheduled to emit light by the light emission drive signal. Therefore, in the example shown in FIG. 8, the light emission control portion 61 switches the light emission drive signal at a timing when the noise NS is input, and causes the second light emission portion 47-2 to emit green light before a timing of time t16 after the predetermined time has elapsed from time t15.

At the timing of time ta, the scan control portion 62 regards the noise NS as the pulse of the control signal S1 and outputs the scan signal S2 to the image sensor 42. The conversion portion 63 acquires the pixel data PD by performing the analog-digital conversion on the analog signal input from the image sensor 42. At the timing of time ta, the predetermined time has not passed since the light source light emission color LC is green, and the conversion portion 63 converts the analog signal into the digital data DD before the image sensor 42 sufficiently receives the reflection light.

Further, at time ta, the conversion portion 63 specifies that the light emission drive signal is a signal instructing the third light emission portion 47-3 to emit a blue light emission color. Then, the conversion portion 63 specifies that the light emission color before the blue light emission color is green in the emission order. The conversion portion 63 generates the digital data DD by adding the color information CI indicating green to the pixel data PD acquired at time ta. Therefore, at time ta, the light emission color of the color information CI included in the digital data DD is green, but the management color information MC remains red. Therefore, after time ta, the color information CI included in the digital data DD does not match the management color information MC.

For example, in a case of a configuration in which the pixel data PD included in the digital data DD is stored in the storage portion 80 on the premise that a color indicated by the management color information MC is correct without comparing with the color information CI, there is a case where, after time ta, the writing control portion 77 mistakenly recognize the pixel data PD included in the digital data DD as the color indicated by the management color information MC and stores the pixel data PD in the storage portion 80. In order to prevent the writing control portion 77 of the present embodiment from writing the pixel data PD of the erroneous light emission color in the storage portion 80, the management portion 75 manages whether or not to write the pixel data PD in the storage portion 80 based on a comparison result between the color information CI by the determination portion 76 with the management color information MC.

Determination Process and Writing Control Process

Figure 9:
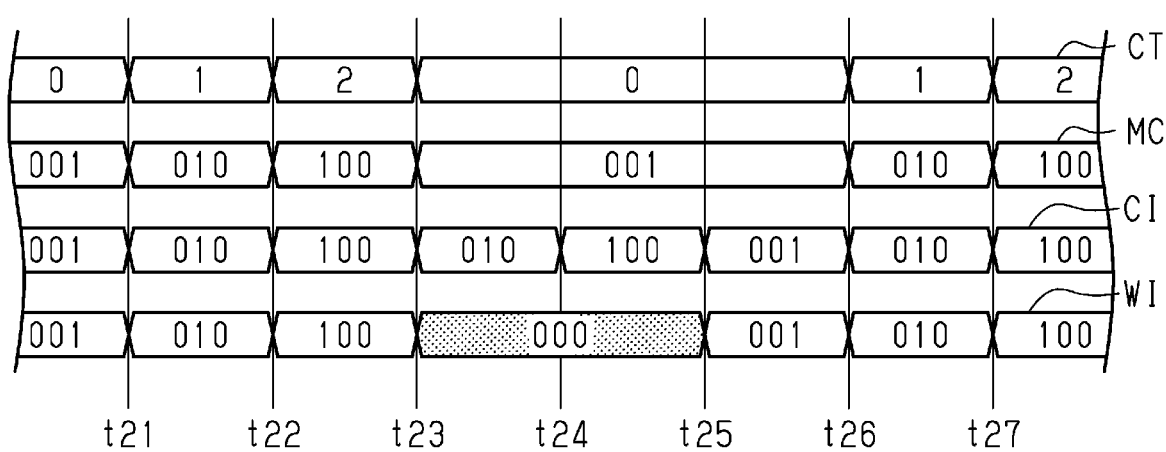
FIG. 9 is a diagram used for explaining a determination process and a writing control process.

Hereinafter, details of the determination process and the writing control process will be described with reference to FIG. 9. FIG. 9 is a diagram showing a chronological change in, for example, the count value of the color counter CT, the management color information MC, the color information CI extracted by the extraction portion 74, and writing color information WI which is information indicating the color of pixel data PD written in the storage portion 80 by the writing control portion 77.

When the power of the image reading apparatus 11 is turned on, the first register 78 stores the positional information 81 read from the storage portion 80 by the computer 70. Further, when the power of the image reading apparatus 11 is turned on, the second register 79 stores the correspondence information 82 read from the storage portion 80 by the computer 70. The correspondence information 82 is, for example, information indicating a correspondence relationship between the values of the color information CI and the management color information MC. The second register 79 includes an R register, a G register, and a B register. The R register stores a 3-bit value indicating the color information CI corresponding to red (R) of the correspondence information 82, the G register stores a 3-bit value indicating the color information CI corresponding to green (G) of the correspondence information 82, and the B register stores a 3-bit value indicating the color information CI corresponding to blue (B) of the correspondence information 82.

The color information CI in the digital data DD is set to a value independently determined by the AFE 60. In the computer 70 of the example, red is set to "001", green is set to "010", and blue is set to "100". In contrast, there is a case where a different value is set to at least one of the three colors in the AFE 60. As an example, there is a case where a value different from that of the computer 70 is set in the AFE 60, for example, red is set to "100", green is set to "001", blue is set to "010", and the like. The computer 70 stores a value of a color set on a side of the AFE 60 in each RGB register of the second register 79. In the case of the above example, the computer 70 stores "100" which is a value of red on the side of the AFE 60 in the R register of the second register 79, "001" which is a value of green on the side of the AFE 60 in the G register, and "010" which is a value of blue on the side of the AFE 60 in the B register. Since the value indicating the color differs depending on a manufacturer of the AFE 60, the computer 70 is provided with the second register 79 to correspond to a case where the AFE 60 of any manufacturer is equipped. During the reading operation of the image reading apparatus 11, the color counter CT has the initial value of "0" and is counted by 1 each time a pulse of the control signal S1 is input.

The extraction portion 74 specifies the bit position, at which the color information CI is positioned, in the digital data DD based on the positional information 81 stored in the first register 78, and extracts, for example, 3-bit color information CI from the specified bit position of the digital data DD. Next, the extraction portion 74 compares the color information CI extracted from the digital data DD with a value stored in each of the RGB registers constituting the second register 79, and outputs the color information CI indicating a color corresponding to one register, the value of which matches, among the RGB registers. Therefore, even when the value of each of the RGB colors, which is indicated by the color information CI, in the digital data DD generated by the AFE 60 is different from the value of the color information of each of the RGB colors that can be recognized by the color management circuit CC2 on a side of the computer 70, the extraction portion 74 outputs the color information CI obtained by converting the value of the color information CI on the side of the AFE 60 into a value that can be recognized by the color management circuit CC2 on the side of the computer 70. For example, when the color information CI extracted from the digital data DD is "100", the value matches a stored value of the R register, so that the extraction portion 74 outputs "001" indicating red corresponding to the R register. Similarly, when the color information CI extracted from the digital data DD is "001", the value matches a stored value of the G register, so that the extraction portion 74 outputs "010" indicating green. When the extracted color information CI is "010", the value matches a stored value of the B register, so that the extraction portion 74 outputs "100" indicating blue. The color information CI output from the extraction portion 74 is input to the determination portion 76 of the color management circuit CC2.

Next, at time t21, the determination portion 76 determines whether or not the color indicated by the color information CI input from the extraction portion 74 matches the color indicated by the management color information MC managed by the management portion 75. At time t21 shown in FIG. 9, since the count value of the color counter CT indicates "1", the management color information MC is "010" and the color information CI is "010". Since the color information CI "010" matches the management color information MC "010", the determination portion 76 specifies that the color indicated by the color information CI of the digital data DD acquired from the AFE 60 is scheduled to be green.

Since the value of the color counter CT is "1" indicating green at time t21, the management portion 75 sets the value "010" indicating green, which is the same as the color indicated by the value of the color counter CT, in the writing color information WI. Since the color indicated by the writing color information WI is green at time t21, the writing control portion 77 writes the pixel data PD to the green storage area in the storage portion 80.

Through the same process, at time t22, the management portion 75, to which the determination result that the color information CI "100" matches the management color information MC "100" is input from the determination portion 76, permits the counting of the color counter CT. Therefore, when the pulse of the control signal S1 is input, the count value of the color counter CT advances by one and becomes "2". Along with this, the management portion 75 sets the value of blue "100" indicated by the value "100" of the color counter CT in the writing color information WI. Since the color indicated by the writing color information WI is blue at time t22, the writing control portion 77 writes the pixel data PD in the blue storage area of the storage portion 80.

In an example shown in FIG. 9, noise NS (see FIG. 8) is superimposed on the control signal S1 between time t23 and time t24. Time t23 in FIG. 9 corresponds to time t15 in FIG. 8, and the color information CI (R) matches the management color information MC (R) in the digital data DD at time t15 in FIG. 8, so that the count value of the color counter CT advances by one and becomes "0" at time t23 in FIG. 9. When noise NS is generated at time tα in FIG. 8, the color information CI extracted from the digital data DD changes from red (R) to green (G). Therefore, at time tα in FIG. 8, the color information CI (G) in the digital data DD does not match the management color information MC (R). As a result, the color information CI changes from blue "100" to green "010" at time t23 in FIG. 9, and the color information CI "010" does not match the management color information MC "001". Therefore, the determination portion 76 determines that the color information CI "010" does not match the management color information MC "001" at time t23.

Further, when the management portion 75 obtains the determination result that the color information CI does not match the management color information MC from the determination portion 76, the management portion 75 does not change the count value of the color counter CT even when the pulse of the control signal S1 is input. Thereafter, the count value of the color counter CT does not change until the color information CI matches the management color information MC. In this way, when the color information CI does not match the management color information MC due to the influence of noise NS, the management portion 75 adjusts the management color information MC to match the color information CI. In the present embodiment, adjustment for causing the management color information MC to match the color information CI is performed through a count value adjustment process which does not change the count value of the color counter CT until the color information CI matches the management color information MC. The adjustment for causing the management color information MC to match the color information CI may be performed through the count value adjustment process that changes the count value of the color counter CT to a predetermined order or a predetermined value.

When writing is prohibited, the management portion 75 sets the value of the writing color information WI to a value different from all of "001", "010", and "100" that can be taken in the color information CI. Hereinafter, it is assumed that the value different from the color information is "000".

At time t23, the writing control portion 77 does not store the pixel data PD in the storage portion 80 based on the value "000" of the writing color information WI set when the determination portion 76 determines that the color information CI does not match the management color information MC. Further, when the writing color information WI is "000", the writing control portion 77 may store the pixel data PD of a predetermined color in the storage portion 80 instead of not storing the pixel data PD of the digital data DD. The pixel data PD of a predetermined color will be described later.

At time t24 in FIG. 9, the determination portion 76 determines that the color information CI "100" does not match the management color information MC "001". Therefore, the count value of the color counter CT is not updated and remains "0". Since the writing color information WI is "000" at time t24, the writing control portion 77 does not store the pixel data PD in the storage portion 80.

At time t25 in FIG. 9, the determination portion 76 determines that the color information CI "001" matches the management color information MC "001". Here, even when the color information CI "001" matches the management color information MC "001", the management portion 75 does not update the color counter CT when the color information CI "001" and the management color information MC "001" are in a non-matching state until then. Therefore, the color counter CT is maintained at "0". On the other hand, when the color information CI "001" matches the management color information MC "001", the management portion 75 sets the writing color information WI to the same value "001" as the color information CI. That is, the writing color information WI is set to a value of red "001" indicated by a count value "0" of the color counter CT. At time t25, the writing control portion 77 stores the pixel data PD of red indicated by the writing color information WI in the storage portion 80. After time t25, the management portion 75 progresses the count value of the color counter CT by "1" whenever the pulse of the control signal S1 is input. After time t26, the color information CI and the management color information MC change while taking the same value. Therefore, after time t26, the color information CI matches the management color information MC, and the pixel data PD is sequentially written in the storage portion 80.

Here, when the pixel data PD in the digital data DD is not stored in the storage portion 80, the pixel data of a predetermined color to be stored in the storage portion 80 instead will be described. The predetermined color may be, for example, a color arbitrarily determined by the user, a predetermined color determined in advance, or a color selected as a color that is inconspicuous in an image generated through the reading process. The inconspicuous color is, for example, white, black, a color having low saturation, or the like. Hereinafter, it is assumed that the predetermined color is white.

The pixel data PD of the predetermined color may be the pixel data PD obtained by performing color interpolation on the pixel data PD for each color, which is obtained in such a way that the image sensor 42 reads upper and lower lines of a line of the pixel data PD in the digital data DD. Before occurrence of noise NS, pixel data for one line is sent as three digital data DDs in the order of R, G, and B. A line at which writing is stopped due to noise NS becomes a missing line without pixel data PD. Thereafter, when the color information CI matches the management color information MC and a rear line next to the missing line is determined, the image processing portion 73 acquires RGB pixel data for two upper and lower lines of the missing line. Then, the image processing portion 73 generates R pixel data of a missing area of the missing line by performing color interpolation process on R pixel data of a front line and R pixel data of a rear line. Similarly, the image processing portion 73 generates G pixel data in the missing area of the missing line by performing the color interpolation process on G pixel data of the front line and G pixel data of the rear line. Further, the image processing portion 73 generates B pixel data in the missing area of the missing line by performing the color interpolation process on B pixel data of the front line and B pixel data of the rear line. Then, the writing control portion 77 writes the pixel data PD of each RGB color obtained by performing the color interpolation process in the missing area of a line of the missing line in a storage area for each color of the storage portion 80. When the writing of the missing area is completed, the pixel data PD of each RGB color constituting the rear line temporarily stored in a buffer (not shown) is written in the line of the rear line in the storage area for each color of the storage portion 80.

Further, the writing control portion 77 may discard the digital data DD including the color information CI that does not match the management color information MC while the writing color information WI has a value of "000". In this case, an area corresponding to a discarded spot of the line in the storage portion 80 is an empty area EA in which nothing is stored. In this case, when the writing color information WI is not a value of "000", for example, the pixel data PD, which should be written at a spot corresponding to a next line of the line including the empty area EA, is written in the empty area EA on one line. Therefore, the same one line of the image is written while deviating by one line in the middle at a part, which is written in the empty area EA on one line, and the other part on the same one line. In this way, a configuration in which the empty area EA is filled with pixel data of the next line may be replaced with a configuration in which the empty area EA remains as the empty area as it is. In this case, in the empty area EA in the storage area for each color of the storage portion 80, the pixel value remains as the initial value and is not changed. The initial value can be set to any value, and may be set to, for example, a pixel value indicating a background color of paper of the document. Along with this, in a read image SI generated through the reading process, the corresponding line is indicated by the color corresponding to the initial pixel value.

Example of Image Generated through Reading Process

Figure 10:
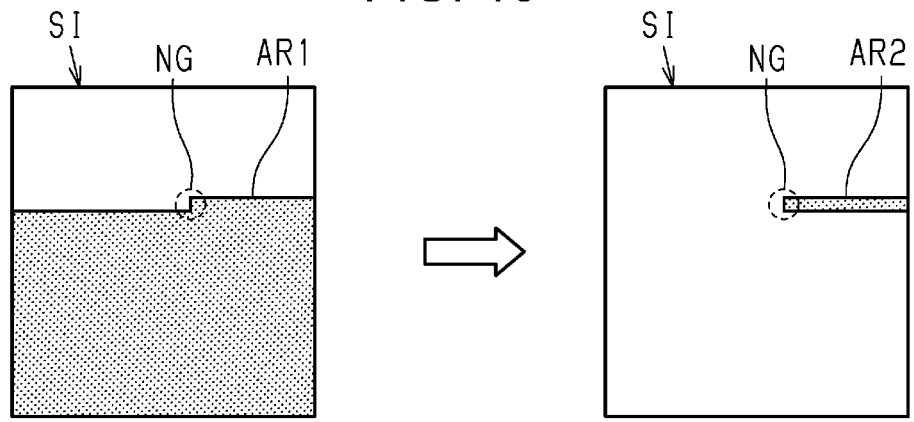
FIG. 10 is a diagram showing an example of a non-corrected read image and a corrected read image.

FIG. 10 shows a read image of the document D in an example in which the pixel data PD of a predetermined color is stored in the storage portion 80 when correction is performed, a left drawing in FIG. 10 is a comparative example in which the correction is not performed, and a right drawing in FIG. 10 is an example in which the correction is performed. As shown in the left drawing of FIG. 10, when the correction is not performed, an actual color of the pixel data PD in the digital data DD deviates from a color indicated by the management color information MC after noise generation NG. Therefore, when the pixel data PD is written in the storage area of the color indicated by the management color information MC in the storage portion 80, there is a case where the pixel has a color different from a color of the original document D in a range AR1 after noise generation NG. On the other hand, according to the image reading apparatus 11 of the present embodiment, the determination process of determining whether or not the color information CI matches the management color information MC is performed, and correction is performed in a case of mismatch in which the colors deviate. Therefore, as shown in the right drawing of FIG. 10, after the color information CI does not match the management color information MC due to noise generation NG, the pixel data PD in the digital data DD is not stored in the storage portion 80 until the color information CI of the digital data DD matches the management color information MC. Instead, instead of the pixel data PD in the digital data DD, the pixel data PD of a predetermined color is stored in the storage portion 80. As a result, as shown in the right drawing of FIG. 10, after noise generation NG, pixels have a predetermined color different from a color of an original document D in a range AR2 corresponding to minimum one line and maximum two lines, but, thereafter, the read image SI generated by the image reading apparatus 11 of the present embodiment can be composed of pixels of an appropriate color. Moreover, since the pixel data PD of the predetermined color written in the range AR2 is the color selected by the user or the preset inconspicuous color, a correction spot of the image is not conspicuous.

Figure 11:
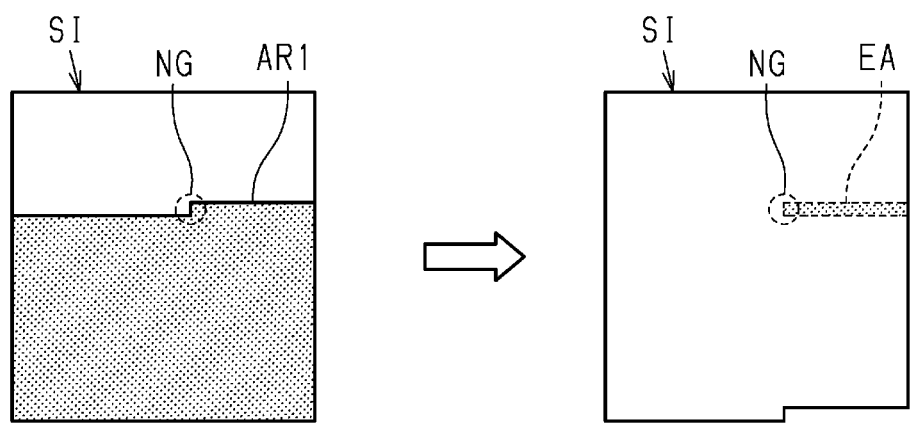
FIG. 11 is a diagram showing an example of a read image from which pixel data of a line influenced by noise is discarded.

FIG. 11 shows the read image SI of the document D stored in the storage portion 80 in the example of discarding the digital data DD when correction is performed, a left drawing in FIG. 11 is a comparative example in which the correction is not performed, and a right drawing in FIG. 11 is an example in which the correction is performed. As shown in the left drawing of FIG. 11, when the correction is not performed, there is a case where the pixels have a color different from the color of the original document D in the range AR1 after noise generation NG, as the same as in the left drawing of FIG. 10.

On the other hand, according to the image reading apparatus 11 of the present embodiment, the determination process of determining whether or not the color information CI matches the management color information MC is performed, and correction is performed in a case of mismatch in which the colors deviate. Therefore, as shown in a right drawing of FIG. 11, after the color information CI does not match the management color information MC due to noise generation NG, the digital data DD is discarded and the pixel data PD is not stored in the storage portion 80 until the color information CI of the digital data DD matches the management color information MC. Therefore, the empty area EA, in which the pixel data PD is not stored in the storage area of the storage portion 80, is generated. As shown in the right drawing of FIG. 10, after noise generation NG, the empty area EA is generated in the read image SI in the range corresponding to minimum one line and maximum two lines. Then, in the empty area EA, the pixel data PD of a corresponding part on the next line of the line including the empty area EA is written by being moved up by one line. After that, the pixel data on the same line is written after deviating by one line in the middle. Since the deviation of the pixel data belonging to the same line is one line, the correction spot of the image is not conspicuous.

Invalidity of Correction

In the above description, a case where, when the determination portion 76 determines that the color information CI does not match the management color information MC, the writing control portion 77 executes the correction process by storing another pixel data PD instead of the pixel data PD in the digital data DD or discarding the pixel data PD in the digital data DD has been described, but the present disclosure is not limited thereto. The writing control portion 77 may switch validity or invalidity of the correction process based on the instruction of the user. For example, the user operates the input portion 21 before or at the start of the reading process to instruct whether or not to validate the correction process. Then, the computer 70 accepts the validity or invalidity of the correction process based on the instruction signal input from the input portion 21. When the correction process is invalid, the writing control portion 77 stores the pixel data PD in the digital data DD in the storage portion 80 even when the determination portion 76 determines that the color information CI does not match the management color information MC. Therefore, as shown in the respective right drawings of FIGS. 10 and 11, the pixels have a color different from the color of the original document D in the wide range AR1 after noise generation NG. Therefore, since the user can understand at a glance that an image quality of the read image SI has deteriorated due to noise NS or the like, the user can read the document D again. For example, for a user who desires a high-quality read image SI, the corrected image quality does not satisfy the request. However, when only one or two lines are corrected through the correction process, there is a high possibility that a local deterioration of the image quality of the read image SI due to the correction process is overlooked. On the other hand, in a configuration in which invalidity of the correction is possible, it is possible to prevent the local deterioration of the image quality due to the correction from being overlooked, and it is possible to acquire the high-quality read image desired by the user by reading again.

As described above, according to the present embodiment, the following effects can be obtained.

1. A relay circuit includes a conversion portion 63. The conversion portion 63 generates digital data DD by adding color information CI indicating a color of reflection light received by an image sensor 42 to pixel data PD obtained by performing analog-digital conversion on a light reception signal.

A control circuit includes an image processing portion 73, and the image processing portion 73 stores the pixel data PD in the digital data DD input from the conversion portion 63 in a storage portion 80 for each color indicated by the color information CI. The image processing portion 73 includes an extraction portion 74, a management portion 75, a determination portion 76, and a writing control portion 77. The extraction portion 74 extracts the color information CI from the digital data DD. The management portion 75 manages management color information MC, which is an estimated value of the color information CI, based on the control signal S1. The determination portion 76 determines whether or not the color information CI extracted by the extraction portion 74 matches the management color information MC. The writing control portion 77 stores the pixel data PD in the digital data DD in the storage portion 80 the color information CI matches the management color information MC, and does not store the pixel data PD in the storage portion 80 when the color information CI does not match the management color information MC. When the color information CI does not match the management color information MC, the management portion 75 adjusts the management color information MC to match the color information CI. As a result, the determination portion 76 can appropriately determine presence/absence of influence of noise NS by comparing the color information CI included in the digital data DD with the management color information MC. When the color information CI does not match the management color information MC due to the influence of noise NS, the management portion 75 adjusts the management color information MC to match the color information CI, so that the writing control portion 77 does not write the digital data DD in the storage portion 80 as the pixel data PD until the influence of noise NS disappears. As a result, it is possible to suppress the influence of noise NS on the read image SI generated through a reading process. Further, the image reading apparatus 11 can suppress the influence of noise NS even in a configuration in which a reading portion 40 includes only one image sensor 42 that commonly receives light of a light emission color from a plurality of light emission portions 47.

2. The digital data DD is data including bits of a plurality of digits, and the color information CI includes a plurality of bits having values located in some digits of the plurality of digits. The control circuit includes a first register 78 that can store the positional information 81 indicating positions of some digits, and the extraction portion 74 extracts the color information CI of the plurality of bits in the digital data DD based on the positional information 81 stored in the first register 78. As a result, the extraction portion 74 can extract the color information CI included in the digital data DD even when bit positions constituting the color information CI in the digital data DD differ depending on a type of AFE 60.

3. There is a case where a value of the color information CI included in the digital data DD differs from a value of the management color information MC even though the color information has the same color as the management color information MC. The control circuit includes a second register 79 that can store correspondence information 82 indicating a correspondence relationship between the value of the color information CI and the value of the management color information MC. The extraction portion 74 performs conversion on the value of the color information CI extracted from the digital data DD based on the correspondence information 82, and then outputs the color information CI to the determination portion 76. As a result, the determination portion 76 can use a color indicated by the color information CI for a determination process even when an expressing method of the color indicated by the color information CI differs depending on the type of the AFE 60.

4. When it is determined that the color information CI does not match the management color information MC, the writing control portion 77 divides the pixel data PD of a predetermined color into each color and stores the resulting pixel data PD in the storage portion 80 instead of the pixel data PD until the determination portion 76 determines that the color information CI matches the management color information MC. The writing control portion 77 can generate an image through the reading process according to an aspect desired by the user by storing a color arbitrarily determined by the user as the predetermined color in the storage portion 80 as the pixel data PD. Further, the writing control portion 77 can suppress the influence of noise NS through a simple process by storing a predetermined color determined in advance as the pixel data PD in the storage portion 80. Further, the writing control portion 77 can suppress influence of noise NS by storing a color, which is inconspicuous in the image generated through the reading process, in the storage portion 80 as the pixel data PD.

5. The pixel data PD of the predetermined color is the pixel data PD obtained by performing color interpolation on the pixel data PD for each color, which is obtained in such a way that the image sensor 42 reads upper and lower lines of a line of the pixel data PD in the digital data DD. According to the configuration, the color interpolation is performed on the pixel data PD of a line, which is not correctly read due to the influence of noise NS, using the pixel data PD of upper and lower lines of the line. Therefore, the image reading apparatus 11 can make color unevenness due to the influence of noise NS less noticeable as compared with a configuration in which the pixel data PD is complemented with dummy pixel data PD exhibiting a predetermined color determined in advance.

6. When the determination portion 76 determines that the color information CI does not match the management color information MC, the writing control portion 77 discards the pixel data PD until the determination portion 76 determines that the color information CI matches the management color information MC. As a result, the writing control portion 77 can suppresses the digital data DD which receives the influence of noise NS from being included in the image generated through the reading process.

7. The writing control portion 77 includes the input portion 21 that, when the color information CI does not match the management color information MC, can instruct whether to validate or invalidate the correction process of not writing the pixel data PD in the storage portion 80. When an instruction of invalidation is received from the input portion 21, the writing control portion 77 stores the pixel data PD in the storage portion 80 even when the color information CI does not match the management color information MC. According to the configuration, the user can select whether to validate or invalidate the correction process according to needs by operating the input portion 21. Therefore, the user can acquire the image data obtained by reading the document D with a desired quality.

8. The computer 70 includes a color counter CT that repeatedly counts the number of pulses of the control signal S1 as many as the number of light emission portions 47. The management portion 75 manages the management color information MC based on a count value of the color counter CT. The management portion 75 performs counting of the color counter CT when the color information CI matches the management color information MC, and stops counting of the color counter CT and maintains the value of the management color information MC when the color information CI does not match the management color information MC. Therefore, when the color information CI does not match the management color information MC due to the influence of noise NS, the counting of the color counter CT is stopped during that time, so that the value of the management color information MC is maintained. At this time, since the value of the color information CI changes, memory of the pixel data PD is sent to the storage portion 80 as many times (for example, maximum 3 times) as the number of light emission portions 47 at the maximum, so that the color information CI matches the management color information MC. Therefore, the influence of noise on the read image is suppressed to be small.

9. An image reading control method is used to acquire an image by reading the document D using a plurality of light emission portions 47 that emit light of light emission colors different from each other and an image sensor 42 that receives reflection light of the light emitted by the light emission portion 47 and reflected by the document D. The image reading control method is provided with a computer 70 that outputs a control signal S1 for controlling the light emission portions 47 and the image sensor 42, and an AFE 60 that controls the light emission portions 47 and the image sensor 42 based on the control signal S1 input from the computer 70. The computer 70 outputs the control signal S1 to the AFE 60. The AFE 60 causes the plurality of light emission portions 47 to sequentially emit light at timings different from each other based on the control signal S1, and causes the image sensor 42 to receive the reflection light of each light emission color to input the light reception signal from the image sensor 42. The AFE 60 generates the digital data DD by adding the color information CI indicating the color of the reflection light received by the image sensor 42 to the pixel data PD obtained by performing analog-digital conversion on the light reception signal, and outputs the digital data DD to the computer 70. The computer 70 acquires the management color information MC which is an estimated value of the color information CI based on the control signal S1. The computer 70 extracts the color information CI from the digital data DD. The computer 70 determines whether or not the extracted color information CI matches the management color information MC. The computer 70 stores the pixel data PD in the storage portion 80 when the color information CI matches the management color information MC, and does not store the pixel data PD in the storage portion 80 when the color information CI does not match the management color information MC. When the color information CI does not match the management color information MC, the computer 70 adjusts the management color information MC to match the color information CI. According to the image reading control method, the same effect as in the image reading apparatus 11 described in 1. can be obtained.

10. A non-transitory computer-readable storage medium storing a program is a program being executed by a computer included in an image reading apparatus 11 which includes a plurality of light emission portions 47 that emit light of light emission colors different from each other and an image sensor 42 that receives reflection light of the light emitted by the light emission portions 47 and reflected by a document D and acquires an image by reading the document D, in which the image reading apparatus 11 includes a computer 70, and an AFE 60 that controls the light emission portions 47 and the image sensor 42 based on a control signal S1 input from the computer 70. A program PR causes the computer 70 to execute a step of causing the AFE 60 to control the light emission portion 47 and the image sensor 42 by outputting the control signal S1 to the AFE 60, a step of inputting, from the AFE 60, digital data DD generated by adding the color information CI indicating a color of the reflection light received by the image sensor 42 to pixel data PD obtained by performing analog-digital conversion on a light reception signal from the image sensor 42 by the AFE 60, a step of acquiring management color information MC which is an estimated value of the color information CI based on the control signal S1, a step of extracting the color information CI from the digital data DD, a step of determining whether or not the extracted color information CI matches the management color information MC, a step of storing the pixel data PD of the digital data DD in the storage portion 80 when the color information CI matches the management color information MC, and not storing the pixel data PD in the storage portion 80 when the color information CI does not match the management color information MC, and a step of adjusting the management color information MC to match the color information CI when the color information CI does not match the management color information MC. According to the program, the same effect as in the image reading apparatus 11 described in 1. can be obtained.

Second Embodiment

Hereinafter, a second embodiment will be described with reference to the accompanying drawings. In the first embodiment, the case where the image reading apparatus 11 includes one AFE 60 has been described. In the second embodiment, a case where the image reading apparatus 11 includes two AFEs 60 will be described. Since the same configuration as in the first embodiment is provided other than a point that two AFEs 60 are provided and a necessary configuration due to the provision of the two AFEs 60, the same reference numerals are given to the same configurations as in the above-described first embodiment and the description thereof will not be repeated. FIGS. 13 to 18 show a read image SI of the document D stored in the storage portion 80, and, in each drawing, a left drawing shows a comparative example in which correction is not performed, and a right drawing shows an example in which correction is performed.

Figure 12:
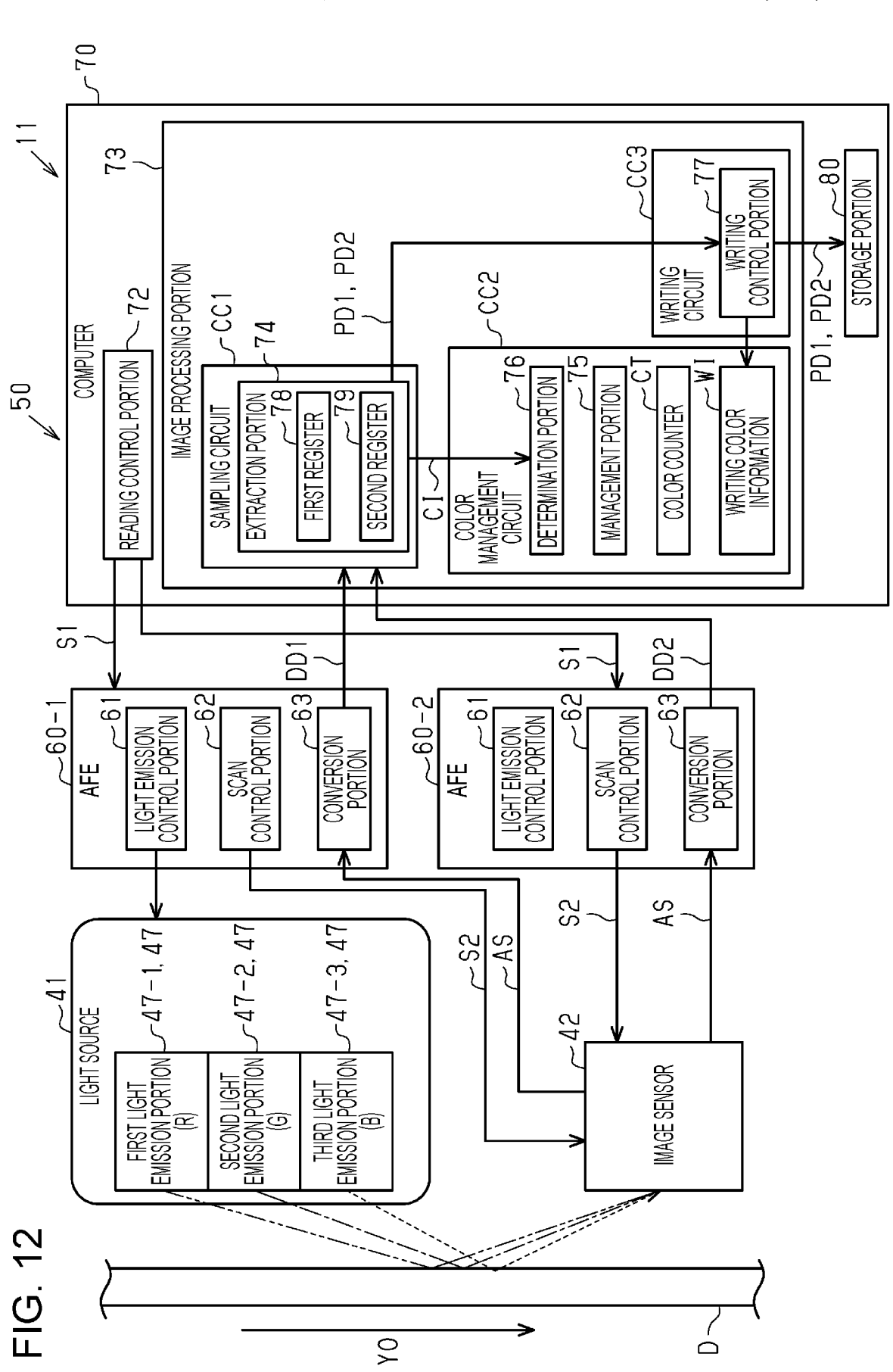
FIG. 12 is a block diagram showing an electrical configuration of a main part of an image reading apparatus, which performs a reading process and a writing process, according to a second embodiment.

As shown in FIG. 12, the image reading apparatus 11 includes a first AFE 60-1 and a second AFE 60-2. Each of the first AFE 60-1 and the second AFE 60-2 has the same configuration as the AFE 60. The first AFE 60-1 executes a process related to a first area of the document D. The second AFE 60-2 executes a process related to a second area of the document D. The first area is one area obtained by dividing a reading area of the document D into two areas in a scanning direction (width direction X) of the image sensor 42. The second area is an area other than the first area in the reading area.

The computer 70, which is an example of a control circuit, and the first AFE 60-1 are coupled by a first wiring, and the computer 70 and the second AFE 60-2 are coupled by a second wiring. The control signal S1 is sent from the computer 70 to the first AFE 60-1 through the first wiring, and the control signal S1 is sent from the computer 70 to the second AFE 60-2 through the second wiring.

One of the first AFE 60-1 and the second AFE 60-2 performs light emission control on the light source 41. The light emission control portion 61 included in the first AFE 60-1 outputs a light emission drive signal to a plurality of light emission portions 47 included in the light source 41 based on the control signal S1 output by the reading control portion 72. A configuration may be provided in which the light emission control portion 61 included in the second AFE 60-2 outputs the light emission drive signal to the light emission portion 47 included in the light source 41 based on the control signal S1 output by the reading control portion 72. Further, the light emission control portion 61 included in the first AFE 60-1 may perform the light emission control on the first area, and the light emission control portion 61 included in the second AFE 60-2 may perform the light emission control on the second area.

The conversion portion 63 included in the first AFE 60-1 generates the digital data DD by adding the color information CI indicating a color of the reflection light received by the image sensor 42A and 42B to the pixel data PD obtained by performing the analog-digital conversion on a first analog signal output by the image sensor 42A and 42B that receives reflection light reflected by the first area. Further, the conversion portion 63 included in the second AFE 60-2 generates the digital data DD by adding the color information CI indicating the color of the reflection light received by the image sensor 42A and 42B to the pixel data PD obtained by performing the analog-digital conversion on a second analog signal output by the image sensor 42A and 42B that receives reflection light reflected by the second area. The conversion portion 63 included in the first AFE 60-1 is an example of a "first conversion portion", and the conversion portion 63 included in the second AFE 60-2 is an example of a "second conversion portion". The first analog signal is an example of a "first light reception signal", and the second analog signal is an example of a "second light reception signal".

In the description below, the digital data DD obtained through conversion performed by the conversion portion 63 of the first AFE 60-1 is referred to as first digital data DD1, and the digital data DD obtained through conversion performed by the conversion portion 63 of the second AFE 60-2 is referred to as second digital data DD2. Further, the pixel data PD in the first digital data DD1 is described as "first pixel data PD1", and the pixel data PD in the second digital data DD2 is described as "second pixel data PD2".

The extraction portion 74 in the computer 70 may perform first extraction for extracting first color information CI1 which is the color information CI in the first digital data DD1, and second extraction for extracting second color information CI2 which is the color information CI in the second digital data DD2. In this case, the extraction portion 74 outputs the extracted first color information CI1 and the second color information CI2 to the determination portion 76.

The determination portion 76 in the computer 70 may perform first determination for determining whether or not the first color information CI1 matches the management color information MC, and second determination for determining whether or not the second color information CI2 matches the management color information MC. Further, the color counter CT in the computer 70 may include a first color counter CT1 that counts a count value for determining a value of the management color information MC1 used in the first determination, and a second color counter CT2 that counts a count value for determining a value of the management color information MC2 used in the second determination. In this case, the management portion 75 may individually perform count control on the first color counter CT1 based on the determination result of the first determination and count control on the second color counter CT2 based on the determination result of the second determination. Further, the management portion 75 in the computer 70 may separately manage first writing color information WI1 according to the determination result of the first determination and second writing color information WI2 according to the determination result of the second determination, as the writing color information WI.

In this case, the writing control portion 77 may store the first pixel data PD1 in a storage area, which corresponds to a color indicated by the first writing color information WU, with respect to the storage portion 80 when the first writing color information WI1 is not a value indicating writing prohibition (for example, "000"). Further, the writing control portion 77 may store the second pixel data PD2 in a storage area, which corresponds to a color indicated by the second writing color information WI2, when the second writing color information WI2 is not the value indicating the writing prohibition (for example, "000"). In this way, the first area A1 and the second area A2 may be individually corrected.

At least one of the extraction portion 74, the management portion 75, the determination portion 76, the color counter CT, and the writing control portion 77 may have the same configuration as in the first embodiment. In this case, the determination portion 76 may perform only selected one in the first determination and the second determination. Further, the writing control portion 77 may prohibit writing of the first pixel data PD1 and the second pixel data PD2 based on the common writing color information WI. As described above, correction may be performed on only one of the first area A1 and the second area A2, or the common correction may be performed on the first area A1 and the second area A2.

Figure 13:
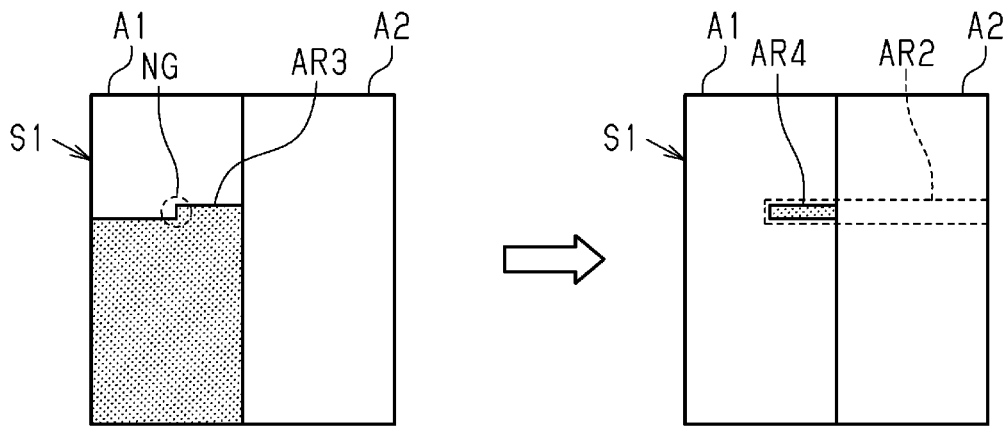
FIG. 13 is a diagram showing an example of a read image when two AFEs are provided.
Figure 14:
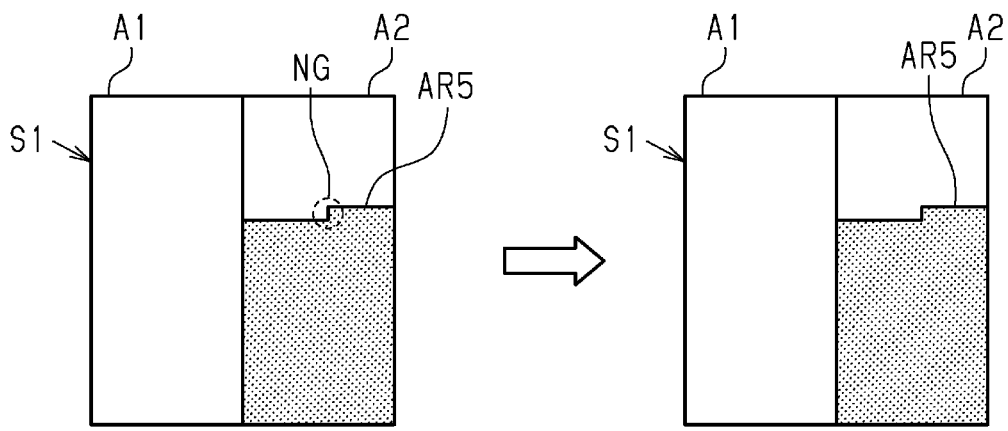
FIG. 14 is a diagram showing an example of a read image generated through correction based on digital data of one of the two AFEs.

When noise NS is generated on the first wiring that couples the first AFE 60-1 to the computer 70, in a comparative example shown in a left drawing of FIG. 13 in which correction is not performed, after noise generation NG, an actual color of the first pixel data PD1 in the first digital data DD1 according to the first area A1 deviates from the color indicated by the management color information MC. Therefore, the pixels have a color different from the color of the original document D in a range AR3 after noise generation NG. Here, the range AR3 is a range smaller than the range AR1, which is obtained after the noise generation NG when the image reading apparatus 11 includes one AFE 60, by the width direction X of the second area A2.

According to the image reading apparatus 11 of the second embodiment, as shown in a right drawing of FIG. 13, the first pixel data PD1 in the first digital data DD1 is not stored in the storage portion 80 until the color information CI matches the management color information MC in the first digital data DD1 after noise generation. As a result, after noise generation NG, the pixels have the color different from the color of the original document D in a range AR4 corresponding to minimum one line and maximum two lines, but, thereafter, the read image SI generated by the image reading apparatus 11 of the second embodiment can be composed of pixels of an appropriate color. Here, the range AR4 is a range smaller than the range AR2, which is a range influenced by noise when the image reading apparatus 11 includes one AFE 60, by a dimension of the number of pixels in the width direction X of the second area A2.

In the above description, a case is described where the writing control portion 77 controls the writing of the pixel data PD based on the determination result determined by the determination portion 76 based on the first digital data DD1 obtained through conversion performed by the conversion portion 63 of the first AFE 60-1, but the embodiment is not limited thereto. For example, the writing control portion 77 may control the writing of the pixel data PD based on the determination result determined by the determination portion 76 based on the second digital data DD2 obtained through conversion performed by the conversion portion 63 of the second AFE 60-2. In this case, when noise influencing the second area A2 is generated, the image reading apparatus 11 of the second embodiment can reduce a range affected by noise as compared with the case where one AFE 60 is provided.

Therefore, when noise influencing one area related to the determination of the determination portion 76 is generated, the image reading apparatus 11 of the second embodiment can halve the range influenced by noise as compared with the case where one AFE 60 is provided.

In the above description, a case is described where the writing control portion 77 controls the writing of the digital data DD based on the determination result determined by the determination portion 76 based on the digital data DD obtained through conversion performed by the conversion portion 63 related to any of the first area A1 or the second area A2. On the other hand, when noise influencing an area different from the area used for the determination of the determination portion 76 is generated, the image reading apparatus 11 cannot reduce the influence of noise. In an example shown in a left drawing of FIG. 14, the determination portion 76 performs the determination process based on the first digital data DD1 obtained through conversion performed by the conversion portion 63 of the first area A1, and the influence of noise is generated in a range AR5 of the second area A2. Therefore, even when the determination process is performed, the determination targets the first area A1 and does not target the second area A2, so that the influence of noise on the range AR5 cannot be reduced in the second area A2 shown on a right drawing of FIG. 14.

Hereinafter, a case will be described where the writing control portion 77 controls writing of the pixel data PD based on the determination result determined by the determination portion 76 based on both the first digital data DD1 related to the first area A1 and the second digital data DD2 related to the second area A2.

In this case, the determination portion 76 determines whether or not each of the two pieces of color information CI, which include the color information CI included in the first digital data DD1 of the first area A1 extracted by the extraction portion 74 and the color information CI included in the second digital data DD2 of the second area A2, matches the management color information MC. When the determination portion 76 determines that both the two pieces of color information CI match the management color information MC, the writing control portion 77 stores both the first pixel data PD1 and the second pixel data PD2 in the storage area in the storage portion 80 corresponding to the color indicated by the writing color information WI input from the management portion 75. Further, when the determination portion 76 determines that at least one of the two pieces of color information CI does not match the management color information MC, the writing control portion 77 does not store only the pixel data on a side of the first pixel data PD1 and the second pixel data PD2, in which the color information CI does not match the management color information MC, in the storage portion 80. Instead, the pixel data PD of a predetermined color is stored in the storage portion 80, instead of the pixel data that is not stored. A period for storing the pixel data PD of the predetermined color is until the determination portion 76 determines that both the two pieces of color information CI match the management color information MC.

Figure 15:
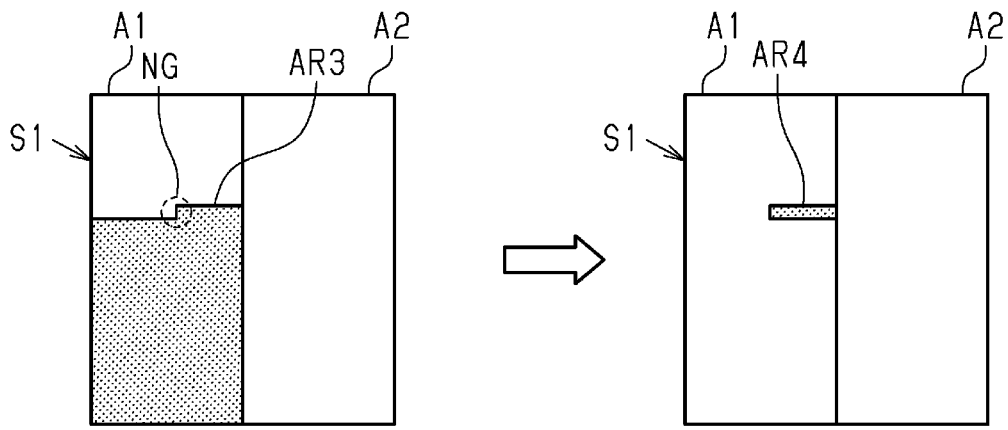
FIG. 15 is a diagram showing another example of the read image when two AFEs are provided.
Figure 16:
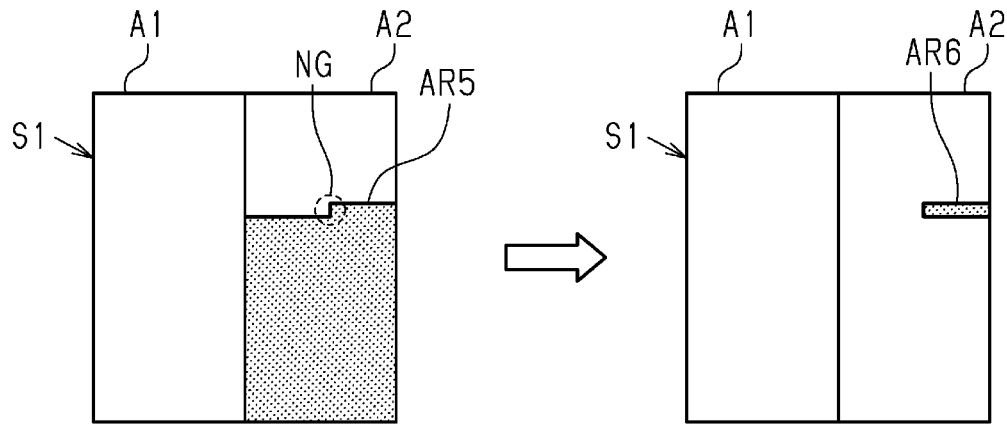
FIG. 16 is a diagram showing an example of a read image generated through correction based on both digital data of two AFEs.

Here, as shown in a left drawing of FIG. 15, when correction is not performed and noise NS is generated in the wiring that couples the computer 70 to the first AFE 60-1, thereafter, an actual color of the first pixel data PD1 in the first digital data DD1 deviates from the color indicated by the management color information MC. Therefore, when the first pixel data PD1 is written in the storage portion 80 as the color indicated by the management color information MC, there is a case where the pixels have a color different from the color of the original document D in the range AR3 after the noise generation NG, as shown in the left drawing of FIG. 15.

On the other hand, according to the image reading apparatus 11 of the present embodiment, as shown in a right drawing of FIG. 15, the writing control portion 77 does not store the first pixel data PD1 related to the first area A1 in the storage portion 80 during a period in which the color information CI does not match the management color information MC after the noise generation, and, instead, writes the pixel data of a predetermined color in the range AR4 of the first area A1. At this time, even during a correction period in which the first pixel data PD1 related to the first area A1 is not stored in the storage portion 80, the second pixel data PD2 related to the second area A2 in which the color information CI matches the management color information MC is stored in the storage portion 80. Therefore, as shown in the right drawing of FIG. 15, the correction spot at which the pixel data of the predetermined color is written in the range AR4 of the first area A1 remains in the first area A1 which occupies half of the read image SI.

Further, when noise NS is generated in the wiring for coupling the computer 70 to the second AFE 60-2, thereafter, the actual color of the second pixel data PD2 in the second digital data DD2 deviates from the color indicated by the management color information MC. Therefore, as shown in a left drawing of FIG. 16, there is a case where the pixels have a color different from the color of the original document D in the range AR5 after noise generation NG.

On the other hand, according to the image reading apparatus 11 of the present embodiment, the writing control portion 77 does not store the second pixel data PD2 related to the second area A2 in the storage portion 80 during a period in which the color information CI does not match the management color information MC after noise generation, and, instead, writes the pixel data of the predetermined color in a range AR6 of the second area A2. As shown in a right drawing of FIG. 16, when the color information CI matches the management color information MC even while the second pixel data PD2 is not stored in the range AR6 of the second area A2, the first pixel data PD1 related to the first area A1 is stored in the storage portion 80. Therefore, as shown in a right drawing of FIG. 16, the correction spot, at which the pixel data of the predetermined color is written in the range AR6 of the second area A2, remains in the second area A2 which occupies half of the read image SI.

According to the image reading apparatus 11 of the second embodiment, when there is the influence of noise NS in any area of the first area A1 and the second area A2, after noise generation NG, the pixels have the color different from the color of the original document D in a range AR corresponding to minimum one line and maximum two lines and the range AR at a position corresponding to both areas, but, thereafter, the areas can be composed of pixels of an appropriate color.

When the determination portion 76 determines that at least one of the two pieces of color information CI does not match the management color information MC, the writing control portion 77 may discard the first pixel data PD1 and the second pixel data PD2. A period during which the first pixel data PD1 and the second pixel data PD2 are discarded is a period until the determination portion 76 determines that both the two pieces of color information CI match the management color information MC.

Figure 17:
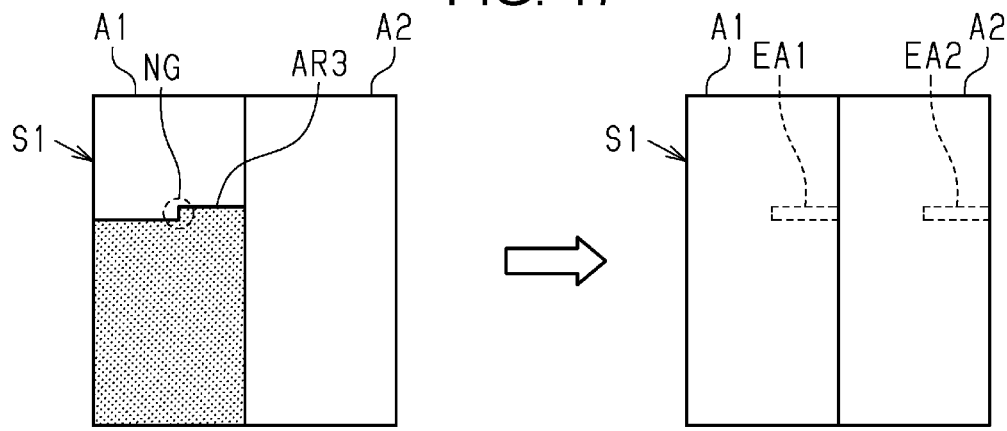
FIG. 17 is a diagram showing an example of a read image from which data of a line influenced by noise is discarded.

As shown in a left drawing of FIG. 17, when the correction is not performed and noise NS is generated in the wiring on a side of the first AFE 60-1, there is a case where the pixels have a color different from the color of the original document D in the range AR3 after noise generation NG in the first area A1.

On the other hand, as shown in a right drawing of FIG. 17, when the correction is performed and noise NS is generated in the wiring on the side of the first AFE 60-1, the color information CI does not match the management color information MC, so that the first pixel data PD1 and the second pixel data PD2 are discarded. That is, when one of the respective two pieces of color information CIs does not match the management color information MC, the first pixel data PD1 and the second pixel data PD2 are discarded together. Therefore, after noise generation, the pixel data PD1 and PD2 are not stored in the storage portion 80 and are discarded until the color information CI matches the management color information MC again, and a first empty area EA1 and a second empty area EA2 are generated in each of the first area A1 and the second area A2. Thereafter, when the color information CI matches the management color information MC, writing of the first pixel data PD1 and the second pixel data PD2 in the storage portion 80 is restarted. A part of the first pixel data PD1 and the second pixel data PD2 written in a line next to the line including the first empty area EA1 and the second empty area EA2 is written so that the first empty area EA1 and the second empty area EA2 are filled. As a result, after noise generation, even the same lines at a part downstream the first empty area EA1 and the second empty area EA2 and the other parts deviate by one line.

Figure 18:
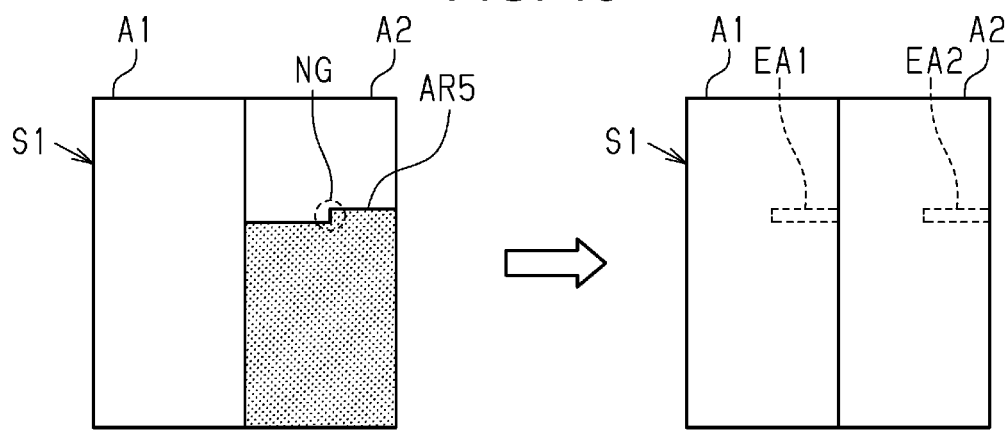
FIG. 18 is a diagram showing an example of a read image from which data of a line influenced by noise is discarded.

Further, as shown in a left drawing of FIG. 18, when correction is not performed and noise NS is generated on the wiring on a side of the second AFE 60-2, there is a case where the pixels have a color different from the color of the original document D in the range AR5 after noise generation NG in the second area A2.

On the other hand, as shown in a right drawing of FIG. 18, when the correction is performed and noise NS is generated in the wiring on the side of the second AFE 60-2, the color information CI does not match the management color information MC, so that the first pixel data PD1 and the second pixel data PD2 are discarded. That is, when one of the respective two pieces of color information CIs does not match the management color information MC, the first pixel data PD1 and the second pixel data PD2 are discarded together. Therefore, as in the right drawing of FIG. 17, after noise generation, until the color information CI matches the management color information MC again, the first pixel data PD1 and the second pixel data PD2 of a next line are written so that to the first empty area EA1 and the second empty area EA2, which are respectively generated in the first area A1 and the second area A2, are filled. As a result, after noise generation, even the same lines at a part downstream the first empty area EA1 and the second empty area EA2 and the other parts deviate by one line.

For example, when one of the two pieces of color information CI does not match the management color information MC and only one of the first pixel data PD1 and the second pixel data PD2 is discarded, there is a possibility that conspicuous deviation of the line occurs between the first area A1 and the second area A2. On the other hand, in the present embodiment, when one of the two pieces of color information CI does not match the management color information MC, the first pixel data PD1 and the second pixel data PD2 are discarded together, so that the deviation of the line, which is generated between the first area A1 and the second area A2 can be suppressed to a small extent.

As described above, according to the second embodiment, the following effects can be obtained.

11. The conversion portion includes a conversion portion 63 of the first AFE 60-1 and a conversion portion 63 of the second AFE 60-2. The conversion portion 63 of the first AFE 60-1 generates the first digital data DD1 by adding the color information CI to the first pixel data PD1 obtained by performing the analog-digital conversion on the first light reception signal output from the image sensor 42 that receives the reflection light reflected in the first area A1 of the document D. The first area A1 is one area obtained by dividing the reading area of the document D into two areas in the scanning direction X of the image sensor 42. The conversion portion 63 of the second AFE 60-2 generates the second digital data by adding the color information CI to the second pixel data obtained by performing the analog-digital conversion on the second light reception signal output from the image sensor 42 that receives the reflection light reflected in the second area which is an area other than the first area A1 of the reading area of the document D. As a result, after noise NS is generated, pixels have a color different from a color of the original document D in a range corresponding to minimum one line and maximum two lines and a range whose width direction X is half, but, thereafter, the image generated by the image reading apparatus 11 can be composed of pixels of an appropriate color.

12. The extraction portion 74 extracts pieces of the color information CI from the first digital data DD1 and the second digital data DD2, respectively. The determination portion 76 determines whether or not each of the two pieces of color information CI extracted by the extraction portion 74 matches the management color information MC. When both the two pieces of color information CI match the management color information MC, the writing control portion 77 stores both the first pixel data PD1 and the second pixel data PD2 in the storage portion 80. Further, when at least one of the two pieces of color information CI does not match the management color information MC, the writing control portion 77 does not store the first pixel data PD1 and the second pixel data PD2 in the storage portion 80 until both the two pieces of color information CI match the management color information MC. According to the image reading apparatus 11 of the second embodiment, when there is the influence of noise NS in any area of the first area A1 and the second area A2, after noise generation NG, the pixels have the color different from the color of the original document D in the range AR corresponding to minimum one line and maximum two lines and the range AR at the position corresponding to both the areas, but, thereafter, the areas can be composed of pixels of an appropriate color.

13. When at least one of the two pieces of color information CI does not match the management color information MC, the writing control portion stores the pixel data PD of the predetermined color in the storage portion 80 instead of the first pixel data PD1 and the second pixel data PD2 until both the two pieces of color information CI match the management color information MC. As a result, the writing control portion 77 can generate the image through the reading process according to the aspect desired by the user by storing the color arbitrarily determined by the user as the predetermined color in the storage portion 80 as the pixel data PD. Further, the writing control portion 77 can suppress the influence of noise NS through a simple process by storing a predetermined color determined in advance as the pixel data PD in the storage portion 80. Further, the writing control portion 77 can suppress influence of noise NS by storing a color, which is inconspicuous in the image generated through the reading process, in the storage portion 80 as the pixel data PD.

14. When at least one of the two pieces of color information CI does not match the management color information MC, the writing control portion 77 discards the first pixel data and the second pixel data until both the two pieces of color information CIs match the management color information MC. According to the image reading apparatus 11 of the second embodiment, when there is the influence of noise NS in one area of the first area A1 and the second area A2, after noise generation NG, the pixels have the color different from the color of the original document D in the range AR corresponding to minimum one line and maximum two lines and the range AR corresponding to both the areas, but, thereafter, the areas can be composed of pixels of an appropriate color.

The embodiment can also be changed to a form as in modification examples shown below. Further, an appropriate combination of the embodiments and the modification examples shown below can be a further modification example, and an appropriate combination of the modification examples can be the further modification example.

When the color information CI does not match the management color information MC, the management portion 75 may return the count value of the color counter CT by 1 in an opposite order to the ascending order or may progress two count values of the color counter CT in ascending order. The management portion 75 can adjust the management color information MC to match the color information CI through the adjustment process performed on the management color information MC.

When the bit position of the color information CI included in the digital data DD is uniquely determined, the computer 70 may not include the first register 78 used by the extraction portion 74, and the storage portion 80 may not store the positional information 81.

When the values indicating the same color in the color information CI and the management color information MC are the same, the computer 70 may not include the second register 79 used by the extraction portion 74, and the storage portion 80 may not store the correspondence information 82.

Instead of a configuration in which the extraction portion 74 uses the second register 79, the determination portion 76 may convert the value of the color information CI into the value of the management color information MC indicated by the color based on the value of the second register 79.

The input portion 21 is not limited to the touch panel, and may be, for example, an operation button.

The power sources of the feeding portion 30A and the transport portion 31 may be common. Further, the transport portion 31 and the discharge portion 32 may be driven by separate power sources, respectively.

The image sensor is not limited to the CMOS image sensor, and may be, for example, a Metal Oxide Semiconductor (MOS) image sensor or a Charge Coupled Device (CCD) image sensor.

The image sensor 42 is not limited to the linear image sensor, and may be an area image sensor.

The material of the document is not limited to paper, and may be a resin film or sheet, woven fabric, a metal film, or the like.

The image reading apparatus may be a part of a multifunction device having a printing function and a copying function in addition to a scanner function.

The image reading apparatus 11 is not limited to the sheet feed type and may be a flatbed type. In the case of the flatbed type image reading apparatus 11, a carriage that can move along the sub-scanning direction (Y direction) is provided in the main body, in which the carriage moves by using a scanning motor as the power source, and the image of the document set on a glass plate of a document stand is read by the light source and the reading portion provided in the carriage. Even in the flatbed type image reading apparatus 11, the embodiment can be applied as long as an automatic document feeding device (auto sheet feeder) that automatically feeds documents is provided. Further, the embodiment is not limited to the image reading apparatus 11, and the embodiment can be applied to the image reading control method and the non-transitory computer-readable storage medium storing a program in the image reading apparatus 11.

Hereinafter, technical ideas and effects grasped from the above-described embodiments and modification examples are described below.

A. An image reading apparatus which acquires an image by reading a document, the apparatus includes a plurality of light emission portions that emit light beams of light emission colors different from each other, a light reception portion that receives reflection light of the light beam emitted by each of the light emission portions and reflected by the document and that outputs a light reception signal, a control circuit that outputs a control signal for controlling the light emission portion and the light reception portion, and a relay circuit, based on the control signal, that causes the plurality of light emission portions to sequentially emit light beams at timings different from each other and that causes the light reception portion to receive reflection light of each of the light emission colors and receives a light reception signal from the light reception portion, in which the relay circuit includes a conversion portion that generates digital data by adding color information indicating a color of the reflection light received by the light reception portion to pixel data obtained by performing analog-digital conversion on the light reception signal, the control circuit includes an image processing portion that causes a storage portion to store, for each color indicated by the color information, the pixel data in the digital data received from the conversion portion, the image processing portion includes an extraction portion that extracts the color information from the digital data, a management portion that manages management color information which is an estimated value of the color information based on the control signal, a determination portion that determines whether or not the color information extracted by the extraction portion matches the management color information, and a writing control portion that causes the storage portion to store the pixel data in the digital data when a determination result of the determination portion indicates that the color information matches the management color information and that does not cause the storage portion to store the pixel data when the color information does not match the management color information, and the management portion adjusts the management color information to match the color information when the color information does not match the management color information.

According to the configuration, the determination portion can appropriately determine presence/absence of influence of noise by comparing the color information included in the digital data with the management color information. When the color information does not match the management color information due to the influence of noise, the management portion adjusts the management color information to match the color information, so that the writing control portion does not temporarily write the pixel data in the storage portion until the influence of noise disappears. As a result, it is possible to suppress the influence of noise on the image generated through a reading process. Further, for example, the influence of noise can be suppressed even in a configuration in which the light reception portion commonly receives light of different light emission colors from the plurality of light emission portions and a configuration in which the number of light reception portions is smaller than the number of light emission portions.

B. In the image reading apparatus, the digital data may be data including bits of a plurality of digits, the color information may include a plurality of bits having values located in some digits of the plurality of digits, the control circuit may include a first storage portion configured to store positional information indicating positions of the some digits, and the extraction portion may extract, based on the positional information in the digital data, which is stored in the first storage portion, the color information of the plurality of bits.

According to the configuration, the extraction portion can extract the color information included in the digital data even when the bit positions constituting the color information in the digital data differ depending on the type of AFE.

C. In the image reading apparatus, there may be a case in which, concerning a color, a value of the color information included in the digital data differs from a value of the management color information, the control circuit may include a second storage portion configured to store correspondence information indicating a correspondence relationship between the value of the color information and the value of the management color information, and the extraction portion may perform, based on the correspondence information, conversion on a value of color information extracted from the digital data and outputs the color information to the determination portion.

According to the configuration, the determination portion can use the color indicated by the color information in a determination process even when an expression method of the color of the reflection light indicated by the color information differs depending on the type of AFE.

D. In the image reading apparatus, when the color information does not match the management color information, the writing control portion may cause the storage portion to store, separately for each color, the pixel data of a predetermined color instead of the pixel data until the color information matches the management color information.

According to the configuration, the writing control portion can generate an image through a reading process according to an aspect desired by a user by storing the color arbitrarily determined by the user as the predetermined color in the storage portion as the pixel data. Further, the writing control portion can suppress the influence of noise through a simple process by storing the predetermined color determined in advance in the storage portion as the pixel data. Further, the writing control portion can suppress the influence of noise by storing a color, which is inconspicuous in the image generated through the reading process, in the storage portion as the pixel data.

E. In the image reading apparatus, the pixel data of the predetermined color may be pixel data obtained by performing, for each color, color interpolation on pieces of pixel data obtained by the light reception portion reading an upper line and a lower line of a line of the pixel data in the digital data.

According to the configuration, the color interpolation is performed on the pixel data of the line, which is not correctly read due to the influence of noise, using the pixel data of the upper and lower lines of the line. Therefore, the image reading apparatus can make color unevenness or the like due to the influence of noise inconspicuous, as compared with a configuration in which the pixel data is complemented with dummy pixel data exhibiting the predetermined color determined in advance.

F. In the image reading apparatus, when the color information does not match the management color information, the writing control portion may discard the pixel data until the color information matches the management color information.

According to the configuration, the writing control portion can suppress the digital data influenced by noise from being included in the image generated through the reading process.

G. The image reading apparatus may further include an input portion configured to receive, when the color information does not match the management color information, instruction for validating or invalidating a correction process of the writing control portion not writing the pixel data in the storage portion, in which when the color information does not match the management color information and when an instruction of the invalidating is received from the input portion, the writing control portion may cause the storage portion to store the pixel data.

According to the configuration, the user can select whether to validate or invalidate the correction process according to needs by operating the input portion 21. Therefore, the user can acquire the image data obtained by reading the document D with a desired quality.

H. In the image reading apparatus, the conversion portion may include a first conversion portion that generates first digital data by adding the color information to first pixel data obtained by performing analog-digital conversion on a first light reception signal output from the light reception portion that receives reflection light reflected in a first area which is one of two areas into which a reading area of the document is divided in a scanning direction of the light reception portion, and a second conversion portion that generates second digital data by adding the color information to second pixel data obtained by performing analog-digital conversion on a second light reception signal output from the light reception portion that receives reflection light reflected in a second area which is an area other than the first area of the reading area of the document.

According to the configuration, after noise generation, pixels have a color different from a color of an original document D in a range corresponding to minimum one line and maximum two lines and a range whose width direction X is half, but, thereafter, the image generated by the image reading apparatus can be composed of pixels of an appropriate color.

I. In the image reading apparatus, the extraction portion may extract color information from each of the first digital data and the second digital data, the determination portion may determine whether or not each of the two pieces of color information extracted by the extraction portion matches the management color information, and the writing control portion may cause the storage portion to store both the first pixel data and the second pixel data when both the two pieces of color information match the management color information and may not cause the storage portion to store the first pixel data or the second pixel data until both the two pieces of color information match the management color information when at least one of the two pieces of color information does not match the management color information.

According to the configuration, when there is the influence of noise in any area of the first area and the second area, after noise generation, pixels have a color different from a color of an original document in a range of a position corresponding to minimum one line and maximum two lines and a range corresponding to both the areas, but, thereafter, areas can be composed of pixels of an appropriate color.

J. When at least one of the two pieces of color information does not match the management color information, the writing control portion may cause the storage portion to store pixel data of a predetermined color instead of the first pixel data and the second pixel data until both the two pieces of color information match the management color information.

According to the configuration, the writing control portion can generate an image through a reading process according to an aspect desired by a user by storing the color arbitrarily determined by the user as the predetermined color in the storage portion as the pixel data. Further, the writing control portion can suppress the influence of noise through a simple process by storing the predetermined color determined in advance in the storage portion as the pixel data. Further, the writing control portion can suppress the influence of noise by storing a color, which is inconspicuous in the image generated through the reading process, in the storage portion as the pixel data.

K. In the image reading apparatus, when at least one of the two pieces of color information does not match the management color information, the writing control portion may discard the first pixel data and the second pixel data until both the two pieces of color information match the management color information.

According to the configuration, when there is the influence of noise in one of the first area and the second area, after noise generation, pixels have a color different from a color of an original document in a range corresponding to minimum one line and maximum two lines and a range corresponding to both the areas, but, thereafter, areas can be composed of pixels of an appropriate color.

L. The image reading apparatus may further include a color counter that repeatedly counts the number of pulses of the control signal as many as the number of the light emission portions, in which the management portion may manage, based on a count value of the color counter, the management color information and may maintain a value of the management color information such that the color counter performs counting when the color information matches the management color information and that the color counter stops counting when the color information does not match the management color information.

According to the configuration, when the color information does not match the management color information due to the influence of noise, the counting of the color counter is stopped during the time, so that the value of the management color information is maintained. At this time, since the value of the color information changes, memory of the pixel data is sent to the storage portion as many as the number of the light emission portions at the maximum, so that the color information matches the management color information and the influence of noise on the read image is suppressed to be small.

M. An image reading control method for acquiring an image by reading a document using a plurality of light emission portions that emit light beams of light emission colors different from each other and a light reception portion that receives reflection light of the light beam emitted by each of the light emission portions and reflected by the document, in which a control circuit is included that outputs a control signal for controlling the light emission portion and the light reception portion and in which a relay circuit is included that controls, based on the control signal received from the control circuit, the light emission portion and the light reception portion. The method includes the control circuit outputting the control signal to the relay circuit, the relay circuit, based on the control signal, causing the plurality of light emission portions to sequentially emit light beams at timings different from each other, and causing the light reception portion to receive reflection light of each of the light emission colors and receiving a light reception signal from the light reception portion, the relay circuit generating digital data by adding color information indicating a color of the reflection light received by the light reception portion to pixel data obtained by performing analog-digital conversion on the light reception signal and outputting the digital data to the control circuit, the control circuit acquiring management color information which is an estimated value of the color information based on the control signal, the control circuit extracting the color information from the digital data, the control circuit determining whether or not the extracted color information matches the management color information, the control circuit causing the storage portion to store the pixel data when the color information matches the management color information and not causing the storage portion to store the pixel data when the color information does not match the management color information, and the control circuit adjusting the management color information to match the color information when the color information does not match the management color information. According to the method, the same effect as in the image reading apparatus can be obtained.

N. A non-transitory computer-readable storage medium storing a program, the program being executed by a computer provided in an image reading apparatus which includes a plurality of light emission portions that emit light beams of light emission colors different from each other and a light reception portion that receives reflection light of the light beam emitted by each of the light emission portions and reflected by a document and which acquires an image by reading the document, in which the image reading apparatus includes a computer and a relay circuit that controls, based on a control signal received from the computer, the light emission portion and the light reception portion. The program causes the computer to execute causing the relay circuit to control the light emission portion and the light reception portion by outputting the control signal to the relay circuit, receiving, from the relay circuit, digital data which the relay circuit generates by adding color information indicating a color of the reflection light received by the light reception portion to pixel data obtained by performing analog-digital conversion on a light reception signal from the light reception portion, acquiring management color information which is an estimated value of the color information based on the control signal, extracting the color information from the digital data, determining whether or not the extracted color information matches the management color information, causing the storage portion to store the pixel data in the digital data when the color information matches the management color information and not causing the storage portion to store the pixel data when the color information does not match the management color information, and adjusting the management color information to match the color information when the color information does not match the management color information. According to the program, the same effect as in the image reading apparatus can be obtained.

What is claimed is:

1. An image reading apparatus which acquires an image by reading a document, the apparatus comprising:
   a plurality of light emission portions that emit light beams of light emission colors different from each other;
   a light reception portion that receives reflection light of the light beam emitted by each of the light emission portions and reflected by the document and that outputs a light reception signal;
   a control circuit that outputs a control signal for controlling the light emission portion and the light reception portion; and
   a relay circuit, based on the control signal, that causes the plurality of light emission portions to sequentially emit light beams at timings different from each other and that causes the light reception portion to receive reflection light of each of the light emission colors and receives a light reception signal from the light reception portion, wherein
   the relay circuit includes a conversion portion that generates digital data by adding color information indicating a color of the reflection light received by the light reception portion to pixel data obtained by performing analog-digital conversion on the light reception signal,
   the control circuit includes an image processing portion that causes a storage portion to store, for each color indicated by the color information, the pixel data in the digital data received from the conversion portion,
   the image processing portion includes
   an extraction portion that extracts the color information from the digital data,
   a management portion that manages management color information which is an estimated value of the color information based on the control signal,
   a determination portion that determines whether or not the color information extracted by the extraction portion matches the management color information, and
   a writing control portion that causes the storage portion to store the pixel data in the digital data when a determination result of the determination portion indicates that the color information matches the management color information and that does not cause the storage portion to store the pixel data when the color information does not match the management color information, and
   the management portion adjusts the management color information to match the color information when the color information does not match the management color information.

2. The image reading apparatus according to claim 1, wherein
   the digital data is data including bits of a plurality of digits,
   the color information includes a plurality of bits having values located in some digits of the plurality of digits,
   the control circuit includes a first storage portion configured to store positional information indicating positions of the some digits, and
   the extraction portion extracts, based on the positional information in the digital data which is stored in the first storage portion, the color information of the plurality of bits.

3. The image reading apparatus according to claim 1, wherein
   there is a case in which, concerning a color, a value of the color information included in the digital data differs from a value of the management color information,
   the control circuit includes a second storage portion configured to store correspondence information indicating a correspondence relationship between the value of the color information and the value of the management color information, and
   the extraction portion performs, based on the correspondence information, conversion on a value of color information extracted from the digital data and outputs the color information to the determination portion.

4. The image reading apparatus according to claim 1, wherein
   when the color information does not match the management color information, the writing control portion causes the storage portion to store, separately for each color, pixel data of a predetermined color instead of the pixel data until the color information matches the management color information.

5. The image reading apparatus according to claim 4, wherein
   the pixel data of the predetermined color is pixel data obtained by performing, for each color, color interpolation on pieces of pixel data obtained by the light reception portion reading an upper line and a lower line of a line of the pixel data in the digital data.

6. The image reading apparatus according to claim 1, wherein
when the color information does not match the management color information, the writing control portion discards the pixel data until the color information matches the management color information.

7. The image reading apparatus according to claim 1, further comprising
an input portion configured to receive, when the color information does not match the management color information, instruction for validating or invalidating a correction process of the writing control portion not writing the pixel data in the storage portion, wherein
when the color information does not match the management color information and when an instruction of the invalidating is received from the input portion, the writing control portion causes the storage portion to store the pixel data.

8. The image reading apparatus according to claim 1, wherein
the conversion portion includes
a first conversion portion that generates first digital data by adding the color information to first pixel data obtained by performing analog-digital conversion on a first light reception signal output from the light reception portion that receives reflection light reflected in a first area which is one of two areas into which a reading area of the document is divided in a scanning direction of the light reception portion, and
a second conversion portion that generates second digital data by adding the color information to second pixel data obtained by performing analog-digital conversion on a second light reception signal output from the light reception portion that receives reflection light reflected in a second area which is an area other than the first area of the reading area of the document.

9. The image reading apparatus according to claim 8, wherein
the extraction portion extracts color information from each of the first digital data and the second digital data,
the determination portion determines whether or not each of the two pieces of color information extracted by the extraction portion matches the management color information, and
the writing control portion causes the storage portion to store both the first pixel data and the second pixel data when both the two pieces of color information match the management color information and does not cause the storage portion to store the first pixel data or the second pixel data until both the two pieces of color information match the management color information when at least one of the two pieces of color information does not match the management color information.

10. The image reading apparatus according to claim 9, wherein
when at least one of the two pieces of color information does not match the management color information, the writing control portion causes the storage portion to store pixel data of a predetermined color instead of the first pixel data and the second pixel data until both the two pieces of color information match the management color information.

11. The image reading apparatus according to claim 9, wherein
when at least one of the two pieces of color information does not match the management color information, the writing control portion discards the first pixel data and the second pixel data until both the two pieces of color information match the management color information.

12. The image reading apparatus according to claim 1, further comprising
a color counter that repeatedly counts the number of pulses of the control signal as many as the number of the light emission portions, wherein
the management portion manages, based on a count value of the color counter, the management color information and maintains a value of the management color information such that the color counter performs counting when the color information matches the management color information and that the color counter stops counting when the color information does not match the management color information.

13. An image reading control method for acquiring an image by reading a document using a plurality of light emission portions that emit light beams of light emission colors different from each other and a light reception portion that receives reflection light of the light beam emitted by each of the light emission portions and reflected by the document, in which a control circuit is included that outputs a control signal for controlling the light emission portion and the light reception portion and in which a relay circuit is included that controls, based on the control signal received from the control circuit, the light emission portion and the light reception portion, the method comprising:
the control circuit outputting the control signal to the relay circuit;
the relay circuit, based on the control signal, causing the plurality of light emission portions to sequentially emit light beams at timings different from each other, and causing the light reception portion to receive reflection light of each of the light emission colors and receiving a light reception signal from the light reception portion;
the relay circuit generating digital data by adding color information indicating a color of the reflection light received by the light reception portion to pixel data obtained by performing analog-digital conversion on the light reception signal and outputting the digital data to the control circuit;
the control circuit acquiring management color information which is an estimated value of the color information based on the control signal;
the control circuit extracting the color information from the digital data;
the control circuit determining whether or not the extracted color information matches the management color information;
the control circuit causing the storage portion to store the pixel data when the color information matches the management color information and not causing the storage portion to store the pixel data when the color information does not match the management color information; and
the control circuit adjusting the management color information to match the color information when the color information does not match the management color information.

14. A non-transitory computer-readable storage medium storing a program, the program being executed by a computer provided in an image reading apparatus which includes a plurality of light emission portions that emit light beams of light emission colors different from each other and a light reception portion that receives reflection light of the light beam emitted by each of the light emission portions and reflected by a document and which acquires an image by reading the document, in which the image reading apparatus includes a computer and a relay circuit that controls, based on a control signal received from the computer, the light emission portion and the light reception portion, the program causing the computer to execute:

causing the relay circuit to control the light emission portion and the light reception portion by outputting the control signal to the relay circuit;

receiving, from the relay circuit, digital data which the relay circuit generates by adding color information indicating a color of the reflection light received by the light reception portion to pixel data obtained by performing analog-digital conversion on a light reception signal from the light reception portion;

acquiring management color information which is an estimated value of the color information based on the control signal;

extracting the color information from the digital data;

determining whether or not the extracted color information matches the management color information;

causing the storage portion to store the pixel data in the digital data when the color information matches the management color information and not causing the storage portion to store the pixel data when the color information does not match the management color information; and adjusting the management color information to match the color information when the color information does not match the management color information.

\* \* \* \* \*